(12) United States Patent
Lu et al.

(10) Patent No.: US 10,522,049 B2
(45) Date of Patent: Dec. 31, 2019

(54) IMAGE SYNCHRONOUS DISPLAY METHOD AND DEVICE

(71) Applicant: SHENZHEN EAGLESOUL TECHNOLOGY CO., LTD., Shenzhen (CN)

(72) Inventors: Qiwei Lu, Puning (CN); Shengqiang Liu, Dalian (CN)

(73) Assignee: SHENZHEN EAGLESOUL TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/567,937

(22) PCT Filed: Dec. 25, 2015

(86) PCT No.: PCT/CN2015/099057
§ 371 (c)(1),
(2) Date: Oct. 19, 2017

(87) PCT Pub. No.: WO2017/084174
PCT Pub. Date: May 26, 2017

(65) Prior Publication Data
US 2018/0247550 A1    Aug. 30, 2018

(30) Foreign Application Priority Data
Nov. 19, 2015 (CN) .......................... 2015 1 0801936

(51) Int. Cl.
*G09B 5/10* (2006.01)
*G09B 5/06* (2006.01)
(Continued)

(52) U.S. Cl.
CPC ............... *G09B 5/10* (2013.01); *G09B 5/065* (2013.01); *H04N 19/00* (2013.01);
(Continued)

(58) Field of Classification Search
None
See application file for complete search history.

(56) References Cited

U.S. PATENT DOCUMENTS

| 5,730,602 A | * | 3/1998 | Gierhart | G09B 11/00 345/179 |
| 2002/0075250 A1 | * | 6/2002 | Shigeta | H04L 29/06 345/204 |

(Continued)

*Primary Examiner* — Justin E Shepard
(74) *Attorney, Agent, or Firm* — Patent Masters LLC

(57) ABSTRACT

A synchronous displaying method and a synchronous displaying apparatus are provided. An ability to transmit at any time is possessed by intercepting screen content at regular time and performing compression, which improves transmission effects and shortens transmission time. A comparison of the intercepted screen content and intelligent determining on the synchronous image is performed by using eigenvalues parsed and obtained during image compression. In addition, synchronous transmission is realized automatically without manual operations. Moreover, the transmission of repeated screen content is avoided to the greatest extent, which reduces storage pressure on student user terminals and ensures content comprehensiveness. Further, marking and judging on the screen image content improve the efficiency of student reviews. For example, students can directly see the last few pages of each blackboard-writing during reviews.

39 Claims, 10 Drawing Sheets

(51) Int. Cl.
*H04N 21/41* (2011.01)
*H04N 21/6405* (2011.01)
*H04N 21/647* (2011.01)
*H04N 19/00* (2014.01)
*H04N 21/214* (2011.01)
*H04N 21/2187* (2011.01)
*G06Q 50/20* (2012.01)

(52) U.S. Cl.
CPC ..... *H04N 21/2143* (2013.01); *H04N 21/2187* (2013.01); *H04N 21/4122* (2013.01); *H04N 21/4126* (2013.01); *H04N 21/6405* (2013.01); *H04N 21/64792* (2013.01); *G06Q 50/20* (2013.01)

(56) References Cited

U.S. PATENT DOCUMENTS

| | | | | |
|---|---|---|---|---|
| 2014/0356843 | A1* | 12/2014 | Yang | G09B 5/00 |
| | | | | 434/362 |
| 2015/0244799 | A1* | 8/2015 | Yamazaki | G06F 16/954 |
| | | | | 715/203 |
| 2015/0378665 | A1* | 12/2015 | Han | H04N 21/4126 |
| | | | | 345/2.2 |

* cited by examiner

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

JPEG luminance quantization table

| 17 | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

JPEG chrominance quantization table

Fig. 8

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

Fig. 9

IMAGE SYNCHRONOUS DISPLAY METHOD AND DEVICE

TECHNICAL FIELD

The present disclosure relates to an image synchronous displaying method, in particular, to an image synchronous displaying method for the same screen display, and especially to the same screen displaying method executed by a computer and used in a network teaching field, and a network teaching system using the method.

BACKGROUND

Teaching modes of traditional teaching ways are becoming increasingly inadequate to the needs of education development. Due to site constraints and non-repeatability of classes, there generally exist the following shortcomings: an order problem of students' seats leads to that students seated at the back cannot see contents of the blackboard or projections; and students can only review notes after class and cannot replay the classes.

In view of the traditional teaching ways, the basic way of the network teaching method existed is: storing the prerecorded audio and/or video information of teachers in a user terminal; and correspondingly uploading the information to the server of a network teaching platform system for students to correspondingly read the information for studies. Through such method, each student can get an equal lesson-taking feeling, as well as a channel of replaying the classes after class at any time.

In such network teaching method, content displayed on the teacher user terminal and content or operations showed by the teacher require to be synchronously transmitted to the student user terminal through the network, so as to achieve sharing of screen displaying information.

The first reference ("Journal of Image and Graphics", Volume 8, Issue 9, September 2003, Zhang Liping et al., "Screen Sharing Scheme Based on Copying Screen and Data Compression") discloses that common screen sharing includes two ways: one achieved by using Graphical User Interface (GUI) vector instructions at the bottom of an operation system; and screen sharing is achieved by utilizing copying screen and a compression technology, where screen displaying content is not achieved by being broken into specific drawing commands, but reappearing of copying screen content is achieved by copying the screen image first, and then performing data compression processing and transmitting it to a client, and decoding, by the client, to display it.

It could be seen that the existing network teaching system generally includes: a teaching information supply terminal (a teacher user terminal), a teaching information receiving terminal (a student user terminal), a server (a local server or a remote background server), a teaching equipment (such as an electronic whiteboard and a projection apparatus), and a wired or wireless interconnection network. These terminals are mainly desktop electronic computers, and adopted networks are generally wired networks based on network cables, which results in that teaching equipment need to be installed in advance, but it is not easy to be moved after the installation. As staffs involved in teaching and learning, they cannot take away terminals they use, and it is not convenient to use the terminals again after completion of the teaching process, for example, it is not convenient for students to review.

There still exist the following problems in the existing network teaching system when processing image synchronous displaying: the student user terminal receives the same screen data in a slow speed; and the teaching process is not smooth with buffering phenomena. That is because in the process during which the existing network teaching system transmits the same screen data, ways of video streaming and teachers manually intercepting screens according to their own judgements are mostly used, which results in when there is an excessive number of student user terminals, a large amount of data needs to be transmitted; and a slow speed, unsmooth displaying, and a buffering phenomenon often appearing in multiple concurrent network transmission affect students' class experience. Besides, teachers need to consider performing timely screen-interception operations while lecturing. Sometimes teachers may forget to intercept screens to send to students, while students cannot determine whether they acquire timely screenshot images, which affects teaching results.

In recent years, in order to facilitate the network transmission of image data and improve the transmission efficiency and fluency, a lot of image compression algorithms emerge, not only making image file storage save plenty of room, but also making the network transmission faster and more efficient. There are generally two kinds of image format compression types, namely, lossy compression and lossless compression. Many compression standards of images and videos use Discrete Cosine Transform (DCT) transform such as Joint Photographic Experts Group (JPEG) and Moving Picture Experts Group (MPEG.).

The second reference ("Modern Computer", 2006, No. 5, Huang Fan, "JPEG Image Retrieval Technique Based on Compressed Fields") discloses an image compression method. As shown in FIG. 1, a JPEG lossy compression coding step based on the DCT transform generally includes: first, dividing an image into several blocks of 8×8 matrices, where each block consists of one direct current eigenvalue (DC eigenvalue) and 63 alternating current eigenvalues (AC eigenvalues); second, performing forward DCT transform to transform a spatial domain into a frequency domain for expression so as to concentrate capabilities on a handful of eigenvalues; third, performing lossy quantization on DCT frequency eigenvalues according to a quantization table to eliminate visual redundancy; fourth, sorting the quantized eigenvalues in a "Z" shape to form a one-dimensional eigenvalue sequence; fifth, encoding the DC eigenvalue by using Differential Pulse Code Modulation (DPCM) algorithm, while performing lossless compression on the AC eigenvalue by using Run Length Encoding (RLE); and finally, performing Huffman encoding on the DC and AC eigenvalues after the processing. Representing texture features and pixel values of each block in the image, the DC eigenvalue and the AC eigenvalue are the main elements that form the image. However, in the existing solution, image acquisition such as copying screen (or intercepting screen), is performed either manually or by setting automatic screenshot according to time for transmission. But problems that whether the screenshots message transmitted is duplicated or effective all exist. Transmissions of unnecessary or repeated images may increase network transmission burden and may also affect users' experience.

In the network teaching process, in order to simulate the same effect as the actual teaching ways and improve quality of online teaching, it is required to promptly same-screen display electronic blackboard-writing and other teaching content displayed on the teacher user terminal on the student user terminal, which requires more efficient and intelligent acquisition, compression, and transmission of images and operation instructions as well as a corresponding network teaching method and system.

SUMMARY

The present disclosure aims to provide an image synchronous displaying method in view of the problems in the existing solution. By means of computer executable method of the present disclosure, the real-time intelligent image synchronous displaying effect of the student user terminal and the teacher user terminal could be realized.

It should be noted that the network teaching according to the present disclosure is not limited to a teaching form of students and teachers. It may include online network teaching, remote network teaching, local network teaching in which teacher users, student users or training users are the main participants, and online web conferencing, remote web conferencing, and local web conferencing, and other communications/interactions forms that take advantage of network for online communications and/or document content displaying, such as remotely collaborative work, in which employees of enterprises and institutions are the main participants.

According to one of the objects of the present disclosure, provided is an image synchronous displaying method for a network teaching system including a teacher user terminal, a student user terminal, a server and a network, comprising the steps of:

a step of starting up the teacher user terminal, prepared to acquire data for synchronous display; a step of acquiring the same screen displaying data, acquiring the same screen displaying image data for synchronous display; a step of acquiring the same screen application data, acquiring the same screen application operation data for synchronous display; an image compression step, compressing the acquired same screen display image data using a Joint Photographic Experts Group (JPEG) format; a step of judging image transmission, judging whether the two adjacent same screen display images compressed by the compression step are the same and determining whether to transmit the image according to the judging result; a step of segmenting the image determined to be transmitted, segmenting the compressed image data determined to be transmitted as well as the application data to form a transmission data packet; a step of transmitting a data packet, transmitting the data packet to a plurality of user terminals in a multicast mode based on a User Datagram Protocol (UDP) protocol; a step of thread monitoring, configured to perform real-time monitoring on the thread when transmitting based on the UDP protocol, and retransmit a lost packet data; a step of processing expired data, configured to discard the expired data in the network teaching system to ensure the network transmission smooth; and a synchronous displaying step, configured to realize synchronous display on the student user terminal for receiving data.

The same screen displaying data is the content displayed on the screen of the teacher user terminal, which is the image data collected by an electronic whiteboard, a projection input apparatus, a handwriting input apparatus, a blackboard or a whiteboard, and an image collecting apparatus comprising the camera and the video camera; and the collected image data is in a Bit Map Picture (BMP) format.

The required same screen application data is obtained by recording and transferring an instruction and coordinate point data comprising path coordinate data by using a client or an APP on the teacher user terminal.

The recording process of the path coordinate data is as follows: A1: parsing the recorded path coordinates data, and storing it to a temporary instruction coordinate stack, and then making an initial arrangement on the screen, and setting a background pattern on a canvas of the screen; A2: creating a new Bitmap, and using this Bitmap to generate a temporary canvas temptCanvas; A3: setting the background of tempBitmap to transparent for the purpose of locating the target of the temporary canvas temptCanvas in the created tempBitmap; A4: after such structure, extracting the coordinate instructions from the instruction stack and restoring them one by one, a corresponding image being drawn on the temporary tempBitmap by all draw functions of the temptCanvas through rewriting performed by means of the temptCanvas, so that in an action backtracking process, draw points, draw lines call the temptCanvas instead of the Canvas originally on the screen, comprising temptCanvas.drawPoint and temptCanvasRect; and A5: after execution of all the instruction coordinate stacks, executing Canvas.drawBitmap (tempBitmap,0,0,null), wherein the temptCanvas is responsible for drawing various brush marks on the tempBitmap, whereas the Canvas is responsible for drawing tempBitmap on the screen.

Before executing the image compression step, uncompressed image data is backed up to form an original image backup database, and when a user receives the compressed image and needs to view a finer image, an original image can be downloaded from the original image backup database by a click operation.

After executing the step of judging image transmission, the original backup data of the compressed image that is determined not to be synchronously displayed to the student user terminals is deleted from the database.

The image compression step further comprises JPEG image primary compression and image secondary compression.

In the JPEG image primary compression process, a DC eigenvalue and an AC eigenvalue of each image are copied and saved as an independent data file when the image is compressed; according to the copied-and-saved data file, the difference value between the DC and AC eigenvalues of two adjacent images are calculated in turn, namely, the sum of differences between components of DC and AC eigenvectors; a greater difference value indicates a bigger difference between the two adjacent images, and a smaller difference value or no differences indicates a smaller difference or no differences between the two adjacent images; and it is determined that the latter image need not be transmitted to the student user terminal for synchronous display.

The calculation method of the difference value between the eigenvalues is: comparing the DC and AC eigenvalues between the two adjacent images; as regards the DC eigenvalue, comparing signs of the components, marking as 1 if the signs of the components are the same, otherwise, marking as 0; as regards the AC eigenvalue, and according to a set contrast threshold, marking as 0 if the difference between the components exceeds the contrast threshold, otherwise, marking as 1; and calculating the number of 0s or 1s thereby, and summing to obtain the difference value between the two adjacent images, wherein the greater the number of 0s indicates the greater the difference between the eigenvectors and the greater the difference between the images.

A plurality of storage files for storing the copied-and-saved DC and AC eigenvalues are set; another storage file is used when one folder is full; and then the system clears the full folder for backup.

The time of intercepting screen image content is gradually and automatically prolonged when no change is, in a long time, detected between screen contents intercepted consecutively.

Current screen content is marked as first edition blackboard-writing content when the difference value is detected to keep basically stable within a certain range; and a starting of a new layout blackboard-writing or new displaying content is judged when a relatively large change in the difference value is detected.

The image secondary compression step sets a further compression ratio according to the image size and {minimum value, maximum value}: {minSize, maxSize} of the number of file bytes specified by the system:

If (image.getBytes ( )>maxSize) {compression ratio=image.getBytes ( )/maxSize*system-defined offset} Else, {compression ratio=1}; and the image compression ratio is obtained according to the size of the image composed of the compressed image and {minSize, maxSize} of the specified number of file bytes: if the image size is greater than the maximum value, compression ratio=image size/ maximum value*system-defined offset, otherwise, compression ratio=1; and the offset is set as 0.4 to 0.6.

When the compressed JPEG image and the same screen application data packet are larger than a limited length of the message, segmenting the JPEG image and the same screen application data packet into several sub data packets according to the equal ratio of the message, i.e., the JPEG image and the same screen application data packet are segmented into several temporary TMP files; the segmented temporary TMP files are transmitted through the network in a multicast mode; and after the student user terminal obtain all the segmented TMP files, the segmented TMP files are merged to form a complete JPEG image, so as to be locally displayed on the student user terminal.

The data is dynamically calculated and segmented according to the data length, and the maximum number of segments is no more than five of such two sets of conditions for comprehensive calculation to obtain a relatively better message array for transmission.

The client of the student user terminal, when receiving the multicast data packet from the teacher user terminal, first checks whether the received data has been received completely, and merges and restores the data message if the received data has been received completely; feedback information is sent to the teacher user terminal immediately when each data message is received; and the student user terminal sends feedback information to the teacher user terminal after receiving instruction information.

The step of thread monitoring specifically comprises: B1: a step of processing data message for transmission: signing and numbering, by the teacher user terminal, the data messages to be transmitted to ensure that IDs of message groups transmitted each time are unified and unique; sending the data messages to a multicast address of a wireless AP (access point), which is a fixed multicast address ranging in 234.5. *. * multicast network segment; and automatically calculating the multicast address when the teacher user terminal starts a program to ensure that each classroom independently occupies a multicast address in a network environment, especially in a local area network environment. B2: a step of starting up a self-daemon thread: starting up, by the teacher user terminal, a self-daemon thread and a timer after transmitting the data message, and setting up a retransmission stack; storing the data and target transmitted this time in the retransmission stack; and starting up, by the self-daemon thread, data message retransmission processing when no data message feedback is received from the student user terminal after the time of starting up the self-daemon thread is reached; and sending the data packet to the student user terminal with no feedback; B3: a step of starting up a feedback daemon thread: automatically starting, by the teacher user terminal, the feedback daemon thread after transmitting a multicast User Datagram Protocol (UDP) data packet and receiving a feedback message from the student user terminal for the first time, wherein the thread performs a guarantee retransmission processing on the feedback of the user terminal according to the segmented data packet and stops the self-daemon thread at the same time; and B4: a message feedback step: first checking, by the client of the student user terminal, whether the received data has been received completely when receiving the multicast data packet from the teacher user terminal, and merging and restoring the data message if the received data has been received completely; and sending the feedback information to the teacher user terminal immediately while receiving each data message.

The specific process of the step of processing expired data is as follows: C1: uploading, by the teacher user terminal, the multicast message to the server; and transmitting, by the server, the multicast message to the student user terminal through the network transmission; C2: pushing, by the student user terminal, the message information into the stack, if the message signature is the packet group currently being processed when receiving the multicast packet, and transmitting the feedback information to the teacher user terminal; C3: emptying the data in the stack, pushing new data into the stack, and performing the follow-up processing after the message data has been received completely if the multicast packet signature received by the student user terminal is newer than data processed in the current stack, which indicates the data in the stack is expired; C4: discarding, by the system, currently received data message if the multicast packet signature received by the student user terminal is older than data processed in the current stack, which indicates the received data message is expired; and C5: receiving, by the teacher user terminal, the data message feedback information from the student user terminal, discarding the data message and performing no other processing if the time stamp of the message is expired, which indicates that there is a delay for the student user terminal to receive the message and the data is expired; and receiving the feedback information if the time stamp of the received data message is the currently transmitted data packet.

As regards the synchronous displaying step, a client or an APP on student user terminal is built-in with an image sub data packet merging and displaying module configured to merge the received several sub data packets such as several temporary TMP files to form a complete JPEG image, and display the image on the student user terminal to achieve the purpose of the same screen display; and, is built-in with a file operation logic module that is the same as the one on the teacher user terminal; the student user terminal in advance loads the electronic file resources of this class during the same screen application process; and during live teachers' courses, the student user terminal acquires, by means of the server, teachers operation instruction data of an electronic document/file, such as an instruction or coordinate point data, and automatically simulates a teacher's operation by using the built-in logic module in combination with the downloaded class electronic document resources, so as to achieve the purpose of the same screen application display.

The real-time received image is locally displayed by the student user terminal and a series of the received synchronous image data are saved as a reproducible video stream; and playback of the video stream is matched with the relative audio recording of the teacher according to the time characteristics to form a video stream with a voice.

According to another object of the present disclosure, provided is an image synchronization display apparatus for a network teaching system including a teacher user terminal, a student user terminal, a server and a network, comprising a processor; and a readable storage medium having computer-readable program codes for performing an operation executed by the processor, the operation comprising: a step of starting up the teacher user terminal, prepared to acquire data for synchronous display; a step of acquiring the same screen displaying data, acquiring the same screen displaying image data for synchronous display; a step of acquiring the same screen application data, acquiring the same screen application operation data for synchronous display; an image compression step, compressing the acquired same screen display image data using a Joint Photographic Experts Group (JPEG) format; a step of judging image transmission, judging whether the two adjacent same screen display images compressed by the compression step are the same and determining whether to transmit the image according to the judging result; a step of segmenting the image determined to be transmitted, segmenting the compressed image data determined to be transmitted as well as the application data to form a transmission data packet; a step of transmitting a data packet, transmitting the data packet to a plurality of user terminals in a multicast mode based on a User Datagram Protocol (UDP) protocol; a step of thread monitoring, configured to perform real-time monitoring on the thread when transmitting based on the UDP protocol, and retransmit a lost packet data; a step of processing expired data, configured to discard the expired data in the network teaching system to ensure the network transmission smooth; and a synchronous displaying step, configured to realize synchronous display on the student user terminal for receiving data.

The same screen displaying data is the content displayed on the screen of the teacher user terminal, which is the image data collected by an electronic whiteboard, a projection input apparatus, a handwriting input apparatus, a blackboard or a whiteboard, and an image collecting apparatus comprising the camera and the video camera; and the collected image data is in a Bit Map Picture (BMP) format.

The required same screen application data is obtained by recording and transferring an instruction and coordinate point data comprising path coordinate data by using a client or an APP on the teacher user terminal.

The recording process of the path coordinate data is as follows: A1: parsing the recorded path coordinates data, and storing it to a temporary instruction coordinate stack, and then making an initial arrangement on the screen, and setting a background pattern on a canvas of the screen; A2: creating a new Bitmap, and using this Bitmap to generate a temporary canvas temptCanvas; A3: setting the background of tempBitmap to transparent for the purpose of locating the target of the temporary canvas temptCanvas in the created tempBitmap; A4: after such structure, extracting the coordinate instructions from the instruction stack and restoring them one by one, a corresponding image being drawn on the temporary tempBitmap by all draw functions of the temptCanvas through rewriting performed by means of the temptCanvas, so that in an action backtracking process, draw points, draw lines call the temptCanvas instead of the Canvas originally on the screen, comprising temptCanvas. drawPoint and temptCanvasRect; and A5: after execution of all the instruction coordinate stacks, executing Canvas.drawBitmap (tempBitmap,0,0,null), wherein the temptCanvas is responsible for drawing various brush marks on the tempBitmap, whereas the Canvas is responsible for drawing tempBitmap on the screen.

Before executing the image compression step, uncompressed image data is backed up to form an original image backup database, and when a user receives the compressed image and needs to view a finer image, an original image can be downloaded from the original image backup database by a click operation.

After executing the step of judging image transmission, the original backup data of the compressed image that is determined not to be synchronously displayed to the student user terminals is deleted from the database.

The image compression step further comprises JPEG image primary compression and image secondary compression.

In the JPEG image primary compression process, a DC eigenvalue and an AC eigenvalue of each image are copied and saved as an independent data file when the image is compressed; according to the copied-and-saved data file, the difference value between the DC and AC eigenvalues of two adjacent images are calculated in turn, namely, the sum of differences between components of DC and AC eigenvectors; a greater difference value indicates a bigger difference between the two adjacent images, and a smaller difference value or no differences indicates a smaller difference or no differences between the two adjacent images; and it is determined that the latter image need not be transmitted to the student user terminal for synchronous display.

The calculation method of the difference value between the eigenvalues is: comparing the DC and AC eigenvalues between the two adjacent images; as regards the DC eigenvalue, comparing signs of the components, marking as 1 if the signs of the components are the same, otherwise, marking as 0; as regards the AC eigenvalue, and according to a set contrast threshold, marking as 0 if the difference between the components exceeds the contrast threshold, otherwise, marking as 1; and calculating the number of 0s or 1s thereby, and summing to obtain the difference value between the two adjacent images, wherein the greater the number of 0s indicates the greater the difference between the eigenvectors and the greater the difference between the images.

A plurality of storage files for storing the copied-and-saved DC and AC eigenvalues are set; another storage file is used when one folder is full; and then the system clears the full folder for backup.

The time of intercepting screen image content is gradually and automatically prolonged when no change is, in a long time, detected between screen contents intercepted consecutively.

Current screen content is marked as first edition blackboard-writing content when the difference value is detected to keep basically stable within a certain range; and a starting of a new layout blackboard-writing or new displaying content is judged when a relatively large change in the difference value is detected.

The image secondary compression step sets a further compression ratio according to the image size and {minimum value, maximum value}: {minSize, maxSize} of the number of file bytes specified by the system: If (image.getBytes ( )>maxSize) {compression ratio=image.getBytes ( )/maxSize*system-defined offset} Else, {compression ratio=1}; and the image compression ratio is obtained according to the size of the image composed of the compressed image and {minSize, maxSize} of the specified number of file bytes: if the image size is greater than the maximum value, compression ratio=image size/maximum value*system-defined offset, otherwise, compression ratio=1, and the offset is set as 0.4 to 0.6.

When the compressed JPEG image and the same screen application data packet are larger than a limited length of the message, segmenting the JPEG image and the same screen application data packet into several sub data packets according to the equal ratio of the message, i.e., the JPEG image and the same screen application data packet are segmented into several temporary TMP files; the segmented temporary TMP files are transmitted through the network in a multicast mode; and after the student user terminal obtain all the segmented TMP files, the segmented TMP files are merged to form a complete JPEG image, so as to be locally displayed on the student user terminal.

The data is dynamically calculated and segmented according to the data length, and the maximum number of segments is no more than five of such two sets of conditions for comprehensive calculation to obtain a relatively better message array for transmission.

The client of the student user terminal, when receiving the multicast data packet from the teacher user terminal, first checks whether the received data has been received completely, and merges and restores the data message if the received data has been received completely; feedback information is sent to the teacher user terminal immediately when each data message is received; and the student user terminal sends feedback information to the teacher user terminal after receiving instruction information.

The step of thread monitoring specifically comprises: B1: a step of processing data message for transmission: signing and numbering, by the teacher user terminal, the data messages to be transmitted to ensure that IDs of message groups transmitted each time are unified and unique; sending the data messages to a multicast address of a wireless AP (access point), which is a fixed multicast address ranging in 234.5. *. * multicast network segment; and automatically calculating the multicast address when the teacher user terminal starts a program to ensure that each classroom independently occupies a multicast address in a network environment, especially in a local area network environment. B2: a step of starting up a self-daemon thread: starting up, by the teacher user terminal, a self-daemon thread and a timer after transmitting the data message, and setting up a retransmission stack; storing the data and target transmitted this time in the retransmission stack; and starting up, by the self-daemon thread, data message retransmission processing when no data message feedback is received from the student user terminal after the time of starting up the self-daemon thread is reached; and sending the data packet to the student user terminal with no feedback; B3: a step of starting up a feedback daemon thread: automatically starting, by the teacher user terminal, the feedback daemon thread after transmitting a multicast User Datagram Protocol (UDP) data packet and receiving a feedback message from the student user terminal for the first time, wherein the thread performs a guarantee retransmission processing on the feedback of the user terminal according to the segmented data packet and stops the self-daemon thread at the same time; and B4: a message feedback step: first checking, by the client of the student user terminal, whether the received data has been received completely when receiving the multicast data packet from the teacher user terminal, and merging and restoring the data message if the received data has been received completely; and sending the feedback information to the teacher user terminal immediately while receiving each data message.

The specific process of the step of processing expired data is as follows: C1: uploading, by the teacher user terminal, the multicast message to the server; and transmitting, by the server, the multicast message to the student user terminal through the network transmission; C2: pushing, by the student user terminal, the message information into the stack, if the message signature is the packet group currently being processed when receiving the multicast packet, and transmitting the feedback information to the teacher user terminal; C3: emptying the data in the stack, pushing new data into the stack, and performing the follow-up processing after the message data has been received completely if the multicast packet signature received by the student user terminal is newer than data processed in the current stack, which indicates the data in the stack is expired; C4: discarding, by the system, currently received data message if the multicast packet signature received by the student user terminal is older than data processed in the current stack, which indicates the received data message is expired; and C5: receiving, by the teacher user terminal, the data message feedback information from the student user terminal, discarding the data message and performing no other processing if the time stamp of the message is expired, which indicates that there is a delay for the student user terminal to receive the message and the data is expired; and receiving the feedback information if the time stamp of the received data message is the currently transmitted data packet.

As regards the synchronous displaying step, a client or an APP on student user terminal is built-in with an image sub data packet merging and displaying module configured to merge the received several sub data packets such as several temporary TMP files to form a complete JPEG image, and display the image on the student user terminal to achieve the purpose of the same screen display; and, is built-in with a file operation logic module that is the same as the one on the teacher user terminal; the student user terminal in advance loads the electronic file resources of this class during the same screen application process; and during live teachers' courses, the student user terminal acquires, by means of the server, teachers operation instruction data of an electronic document/file, such as an instruction or coordinate point data, and automatically simulates a teacher's operation by using the built-in logic module in combination with the downloaded class electronic document resources, so as to achieve the purpose of the same screen application display.

The real-time received image is locally displayed by the student user terminal and a series of the received synchronous image data are saved as a reproducible video stream; and playback of the video stream is matched with the relative audio recording of the teacher according to the time characteristics to form a video stream with a voice.

According to another object of the present disclosure, provided is a network teaching system comprising a server and a plurality of user terminals, characterized in that the system can execute said method or comprises the image synchronous displaying apparatus for transmitting the image content on the screen of one of the user terminals to other terminals to realize synchronous display.

By using the method and the apparatus of the present disclosure, an ability to perform transmission at any time is possessed by intercepting screen content at regular time and performing compression, thereby improving transmission effects and shortening transmission time. A rapid comparison of the intercepted screen content and intelligent determining on the synchronous image are realized by using eigenvalues parsed and obtained during image compression, synchronous transmission is realized automatically without manual operations. Moreover, transmission of repeated screen content is avoided to the greatest extent, which reduces storage pressure on student user terminals and ensures content comprehensiveness. In addition, marking and judging on the screen image content help to improve efficiency of student review. For example, students can directly see the last few pages of each blackboard-writing during reviews, generally is the more comprehensive blackboard content, without the need to browse the previous process blackboard image, improving the efficiency of the review, and if student want to see the process and progress of lecture, the content won't be missed.

The network teaching system of the present disclosure dispenses with the traditional teaching system and the way consist of a fixed classroom, a podium, a teaching plan, a textbook, a blackboard, chalk and so on, the modern Internet interactive teaching pattern is realized, and dispenses with the time and space limit. By means of storing the electronic textbooks by using database, the burden of carrying heavy textbooks is reduced, the teaching efficiency, interactivity and interestingness are improved.

The disclosure has the advantages that the user terminal is light in weight, and is convenient to carry, the problem of existing classroom teaching system is effectively solved, where the problems are the original desktop computer cabinet is bulky, a large space is occupied, devices are too many, wiring is complicated, operation is inconvenient and trouble is hard to eliminate.

The same screen teaching allows students at class to accurately see the teacher's mark of the important knowledge at any time, and the teacher can mark the teaching plan while lecturing at any time, so that each student in their own teaching equipment see the teacher's mark and get a clearer understanding of the relevant knowledge points. The problems of the existing methods that the students in the classroom cannot keep up with the teaching speed and explanation are eliminated.

By the image compressing method of a high ratio, transmitted video streams and the size of the image are reducing. When students get home, they can see their missing or uncertain knowledge points and consolidate learning by playing back the class.

The core of the disclosure lies in that, on the basis of the existing solution, the problems of image displaying and synchronous display of application image data in the network teaching system are solved in an organic and systematic way. Subjected to using some techniques, there may be independent applications in the existing solution, but there is no enlightenment or revealing to creative application of organic integration and systematical improvement of these technologies, and unexpected technical effects of the disclosure is achieved.

BRIEF DESCRIPTION OF THE DRAWINGS

The embodiments will be more readily understood in view of the following description when accompanied by the below figures and wherein like reference numerals represent like elements, wherein:

FIGS. 6-1 to 6-3 are schematic diagrams of a process of obtaining path coordinate data according to the present disclosure;

FIG. 8 is a JPEG luminance and chrominance quantization table according to the present disclosure;

FIG. 9 is a sequence number of a zigzag-scanned DCT eigenvalue according to the present disclosure;

DETAILED DESCRIPTION

Reference will now be made in detail to the embodiments of the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

In addition, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

Figure 2:
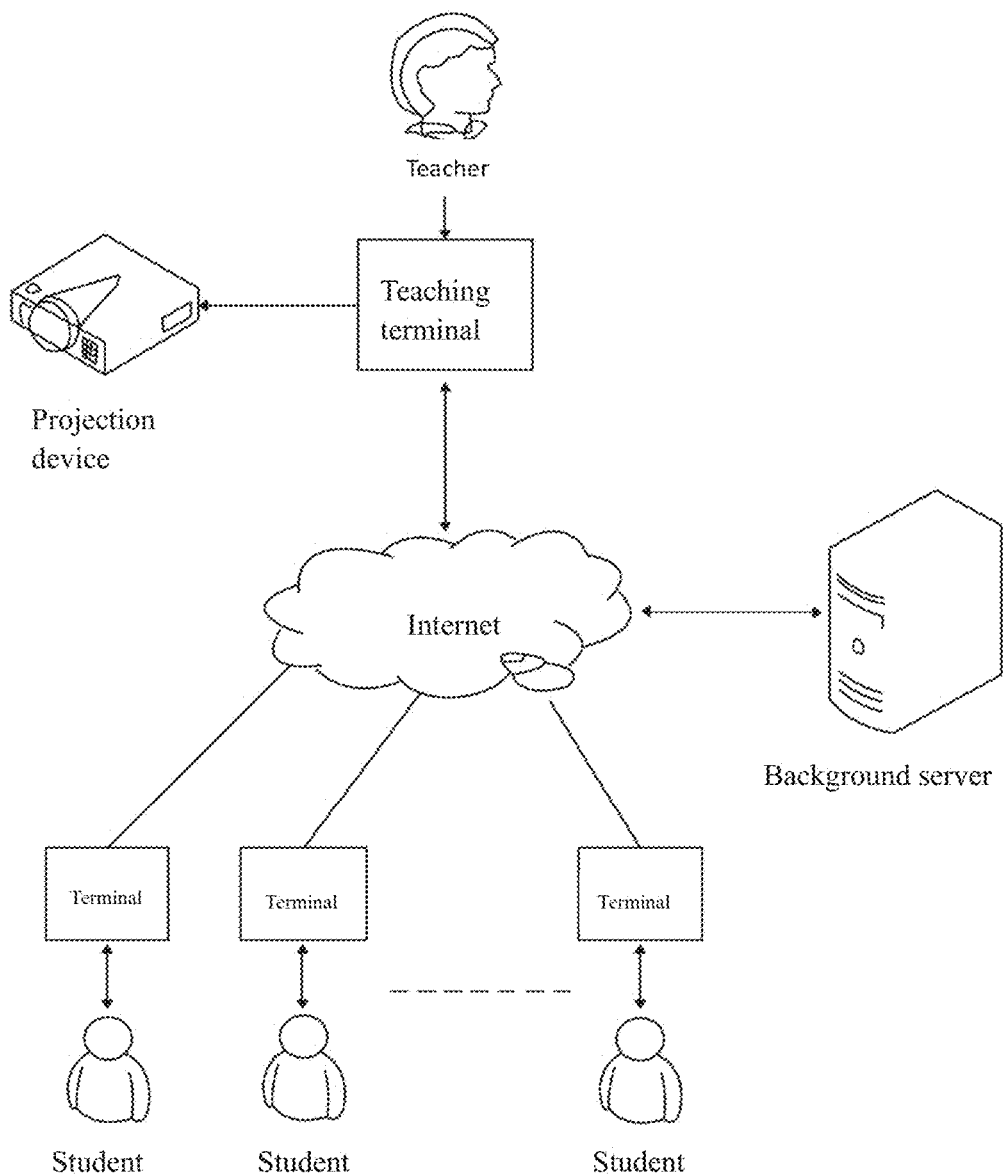
FIG. 2 is a diagram of the basic structure of a network teaching system according to the present disclosure.

As shown in FIG. 2, according to the schematic diagram of the network teaching system referred to in the image synchronous displaying method according to the present disclosure, the network teaching system includes a background server, a plurality of user terminals (student terminals, teaching terminals for teachers), and Internet, where the server may be a local server and/or a remote server deployed on a remote host or a cloud server on a network cloud, and the client of the network teaching system runs on the user terminals. In addition, a projection device or the like may also be included. The network is the Internet, which may be a local area network (such as a campus network) and a wide area internet, may be a wired Internet or may also be a wireless Internet, or any combination thereof. The client may be one of various software clients or mobile phone APPs.

Figure 3:
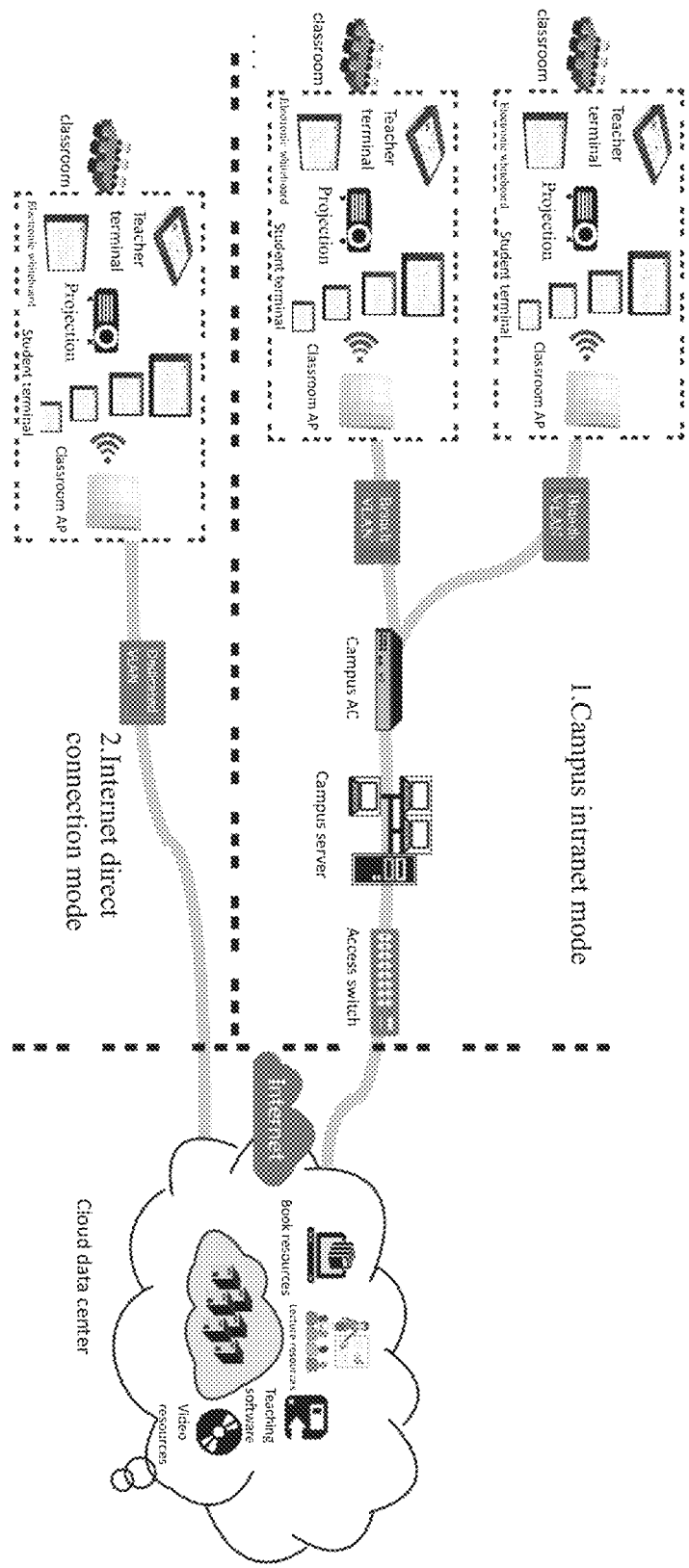
FIG. 3 is a specific example diagram of a network teaching system according to the present disclosure.

As shown in FIG. 3, according to the specific example diagram of the network teaching system referred to in the image synchronous displaying method according to the present disclosure, the network teaching system exemplarily includes a cloud data center part, a campus intranet mode part, and the Internet direct connection mode part. The cloud data center includes at least one server, on which may include book resources, curriculum resources, teaching software, and video resources. The campus intranet mode part includes an access switch, a campus local server, a campus AC access point, and a plurality of class APs arranged in classrooms and connected by using a branch Virtual Local Area Network (VLAN). Each classroom includes a plurality of student terminals, a projection device, an electronic whiteboard, and a teacher terminal. The Internet direct connection mode part may be directly connected to the cloud data center via Internet without a campus server.

It should be noted again that the network teaching according to the present disclosure is not limited to a teaching form of students and teachers. It may include online network teaching, remote network teaching, local network teaching in which teacher users, student users or training users are the main participants, and online web conferencing, remote web conferencing, and local web conferencing, and other communications/interactions forms that take advantage of network for online communications and/or document content displaying, such as remotely collaborative work, in which employees of enterprises and institutions are the main participants.

Figure 4:
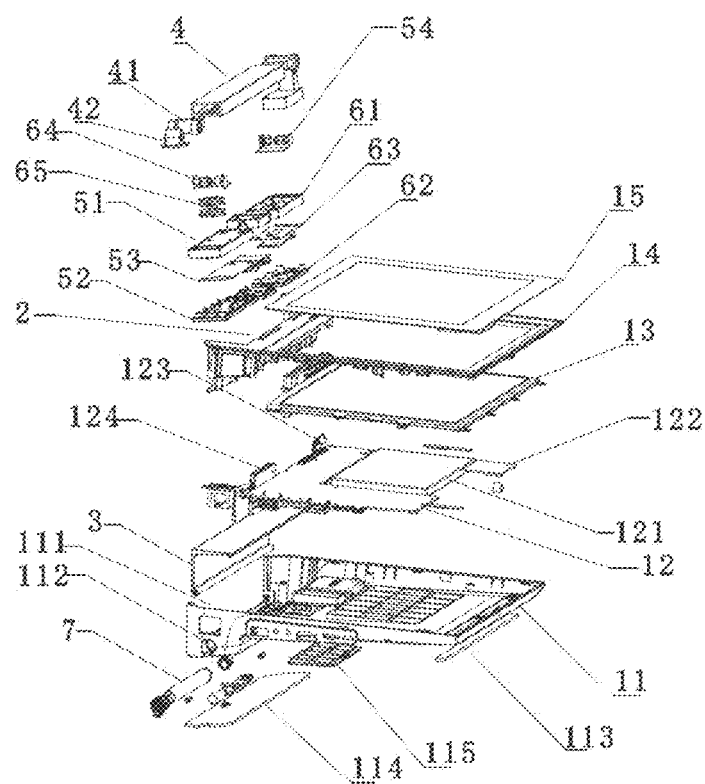
FIG. 4 is a schematic diagram of a user terminal of the network teaching system according to the present disclosure.

As shown in FIG. 4, according to the structural schematic diagram of the user terminal of the network teaching system according to the present disclosure, as a typical user terminal that can be adopted by the network teaching system of the present disclosure, the present disclosure is not limited to such user terminal. For a detailed description of such typical terminal, see Chinese Patent Application 201410553620.8, and a detailed description of the structure will not be repeated herein. A brief description is as follows:

The user terminal includes a host computer 1, where the host computer 1 includes a bottom case 11 and a middle frame 14; a main plate 12, a liquid crystal panel 13, and a touch panel 15 are fixedly mounted between the bottom case 11 and the middle frame 14; a main board circuit is disposed on the main plate 12, where the main board circuit includes an audio noise reduction circuit and a CPU chip, and the CPU is connected to a CM6571 chip in the audio noise reduction circuit by means of a USB interface; and the touch screen 15 is a capacitive electromagnetic composite double-layer touch screen, where the upper layer is a capacitive screen and the lower layer is an electromagnetic screen.

The main board 12 is further mounted with a battery 121, a 3G module, a SIM card slot, an IC card slot 124, and a magnetic head 123 of a magnetic card, where the 3G module, the SIM card slot, the IC card slot 124, and the magnetic head 123 of the magnetic card are all connected to the main board circuit; the main board circuit is connected to the battery 121 and is supplied with electric power by using the battery 121; the magnetic head 123 of the magnetic card is configured to read magnetic stripe information of the magnetic card, and the IC card slot 124 is configured to be inserted by the IC card to read the IC card information. In the present disclosure, swiping of a bank card is realized by using the IC card slot and the magnetic head of a magnetic card, which facilitates on-site payment for teaching and training institutions, and realizes purposes of signing in by swiping and membership management by issuing membership cards.

The main board 12 is provided with an FPC connector 122, and may be connected to the LCD screen 13 by means of the FPC connector 122.

The rear end of the bottom case 11 is mounted with an opening groove 111; the rear end of the middle frame 14 is mounted with a receiving groove 2, where the receiving groove 2 is correspondingly located in the opening groove 111, and the opening groove 111 is also mounted with a reversible cover 3 which can be turned upside down so as to form a corresponding sealed cavity with the receiving groove 2 after the reversible cover 3 is turned over. The rear end of the bottom case 11 is also provided with an insertion hole 112, in which an electromagnetic pen 7 is correspondingly fixed, where the electromagnetic pen 7 is built-in with a control circuit, an electromagnetic pen sensor module, and a power supply battery; the control circuit is electrically connected to the electromagnetic pen sensor module and the power supply battery; one end is an electromagnetic pen tip; and the other end is a laser pen end. The middle part of electromagnetic pen is mounted with a noise reduction microphone and the noise reduction microphone is connected to a control circuit, where the control circuit is mounted with a Bluetooth module for transmitting an audio signal; and the electromagnetic pen not only can write directly on a touch screen, but also can be used as a microphone and a laser remote controller while holding in the hand.

The bottom of the bottom case 11 is also mounted with a card cover 115 for fastening the 3G module. In addition, in order to achieve a better viewing angle, a rear support pad 114 is mounted at the rear end of the bottom case 11 and a front support pad 113 is mounted at the front end of the bottom case 11, so that the entire host computer 1 is at a certain tilt angle and is convenient for users to watch and use.

A high-speed camera is mounted in the receiving groove 2, where the high-speed camera includes a main frame 4, a sub-frame 5, and a photographing lever 6. One end of the main frame 4 is rotatably connected to a shaft member 42 fixedly mounted in the receiving groove 2 by means of a rotating shaft member 41, and the other end is movably connected to the sub-frame 5 by means of a first vertical rotating shaft 54.

The sub-frame 5 includes a sub-frame upper cover 51, a sub-frame lower cover 52, and a circuit board 53 mounted between the sub-frame upper cover 51 and the sub-frame lower cover 52, where the circuit board 53 is connected to a motherboard circuit on a motherboard 12 by using a circuit mounted in the main frame 4.

Generally speaking, the user terminal that can be adopted includes: a processor, a network module, a control module, a displaying module, and an intelligent operating system, where the user terminal may be mounted with all kinds of data interfaces connected to various expansion devices and accessories through a data bus; the intelligent operating system includes running platforms for Windows, Android and its improvement, and iOS, on which application software can be installed and run to realize functions of various application software, services and, application program stores/platforms in the intelligent operating system.

The user terminal may use various users' individual mobile access devices that meet corresponding performance requirements, such as a tablet computer, a smart phone, and a notebook computer, as long as the devices are installed with application software based on the method or apparatus of the present disclosure. For example, a customized 10.1-inch Android tablet computer could be employed. The user terminal needs to use a login account to enter the client of the system. The user terminal may include a teacher user terminal, a student user terminal, and a parent user terminal, etc., and different users use different identities to login clients of the corresponding user terminals, while devices enter corresponding system interfaces to achieve corresponding functions.

In the present disclosure, the user terminal can be connected to the Internet in a network connection way such as RJ45/Wi-Fi/Bluetooth/2G/3G/4G/Ghn/Zigbee/Z-ware/RFID; can be connected to other terminals or other computers and equipment with the help of the Internet and can be connected to various expansion devices and accessories via a variety of data interfaces or a bus mode of 1394/USB/serial/SATA/SCSI/PCI-E/Thunderbolt/data card interface, and a connection way such as audio and video interface of HDMI/YpbPr/SPDIF/AV/DVIVGA/TRS/SCART/Displayport, thus a conference/teaching equipment interactive platform system is formed.

The user terminal may be mounted with a voice capture control module and a motion capture control module in a software form, or a voice capture control module and a motion capture control module in the form of hardware on the data bus to realize voice and action control functions; displaying, projection, sound accessing, audio and video playing, and digital or analog audio and video input and output functions are achieved by connecting a display/projection module, a microphone, an audio equipment and other audio and video equipment via an audio and video interface; image accessing, voice accessing, usage controlling and screen recording of an electronic whiteboard, and a Radio Frequency Identification (RFID) reading function are realized by connecting a camera, a microphone, an electronic whiteboard and an RFID reader through a data interface; mobile storage devices, digital devices and other devices can be accessed and controlled through corresponding interfaces; and functions including controlling, interacting, and screen rejecting among multi-screen devices are achieved by using a Digital Living Network Alliance (DLNA)/Intelligent Grouping and Resource Sharing (IGRS) technique and the Internet technology.

In the present disclosure, the processor is defined to, but is not limited to, include: an instruction execution system such as a system based on a computer/processor, an Application Specific Integrated Circuit (ASIC), a computing device, or hardware and/or software systems that can obtain or acquire logics from a non-temporary storage medium or a non-transitory computer-readable storage medium, and execute instructions contained in the non-temporary storage medium or the non-transitory computer-readable storage medium. The processor may further include any controller, a state machine, a microprocessor, an Internet-based entity, service or feature, or any other analog, digital and/or mechanical implementation manners thereof.

In the present disclosure, a computer-readable storage medium is defined to, but is not limited to, include: any medium capable of containing, storing, or retaining programs, information, and data. The computer-readable storage medium includes any of a number of physical media, such as an electronic medium, a magnetic medium, an optical medium, an electromagnetic medium, or a semiconductor medium. More specific examples of appropriate computer readable storage media and memories used by user terminals and servers include, but are not limited to: a magnetic computer disk (such as a floppy disk or a hard drive), a magnetic tape, a Random Access Memory (RAM), a Read Only Memory (ROM), an Erasable Programmable Read-Only Memory (EPROM), a Compact Disk (CD) or a Digital Video Disk (DVD), a Blu-ray storage disks, a Solid State Disk (SSD), and a flash memory.

The course information which is recorded and uploaded by the teacher user terminal is stored by the background server, and is matched with the course information by the ID and the timestamp of the recording course. The system of CentOS 6.4 or above is deployed on the background server, and a Meta Quarter Language (MQL) database is used for storing terminal interactive data including audio, video and text files, to form a directory and an index for reading and calling, and also storing event information, login information, and log information generated by the system operation for uploading and management of courseware by a courseware editing management system.

The teacher user terminal, the student user terminal, and the background server are connected through the network, and the three may realize wired communication through an RJ45 interface, or realize wireless network communication by using a commercial wireless communication way such as a WIFI module, a 3GPCI-E module, and a 2G, 3G, 4G, and 5G module. A SIM card can be inserted in the module. The teacher user terminal is used for recording a teacher's course and accordingly uploading and storing it in the form of the data stream and the audio stream to the background server, and the student user terminal is used for acquiring the ID of the recorded course, and correspondingly reading the data stream and the audio stream corresponding to the timestamp from the background server. The data stream is lecture time and action information recorded by the teacher user terminal in the teacher multimedia classroom; and the audio stream is classroom time and voice information recorded by the teacher user terminal in the teacher multimedia classroom.

The network teaching system further includes a projection device in communication connection with the teacher user terminal. The projection device adopts a projector, and a screen or a widescreen display. When used for classroom teaching, projection device is connected to the teacher control terminal by using a High Definition Multimedia Interface (HDMI) interface, and touch screen content of the terminal is displayed.

A teacher user logs in the background server through the teacher user terminal and downloads and installs a courseware editor. The editor source code is developed in a C&C++ mode, and multiple-choice questions, single-choice questions, and judgment questions are added and edited based on the Office 2010 Word edition and then uploaded to the background server to form test courseware and courseware analysis results to be stored in the server in an eXtensible Markup Language (XML) document format. The user terminal divides the courseware by using information parsed by the courseware to generate a Shock Wave Flash (SWF) question file and displays it on the touch screen. The intelligent judgment of an answer is carried out by comparing the answer completed by a student with a pre-stored answer at a server side, and the results can be automatically accounted after answering to facilitate in-class practices or tests. The student user logs in the background server through the student user terminal, downloads an electronic document file used in the class, and stores it in a local terminal.

The image synchronous displaying method of the present disclosure synchronously displays the contents on a user terminal to other user terminals. Generally, the user terminal is a teacher user terminal, and the terminals accepting the displaying content are generally student user terminals.

The detailed operation flow of each step of the image synchronous displaying method according to the present disclosure is described in detail below, The image synchronous displaying method applied to a network teaching system comprising a teacher user terminal, a student user terminal, a server, and a network, comprises the following steps:

a step of starting up the teacher user terminal, prepared to acquire data for synchronous display;

a step of acquiring the same screen displaying data, acquiring the same screen displaying image data for synchronous display;

a step of acquiring the same screen application data, acquiring the same screen application operation data for synchronous display;

an image compression step, compressing the acquired same screen display image data using a Joint Photographic Experts Group (JPEG) format;

a step of judging image transmission, judging whether the two adjacent same screen display images compressed by the compression step are the same and determining whether to transmit the image according to the judging result;

a step of segmenting the image determined to be transmitted, segmenting the compressed image data determined to be transmitted as well as the application data to form a transmission data packet;

a step of transmitting a data packet, transmitting the data packet to a plurality of user terminals in a multicast mode based on a User Datagram Protocol (UDP) protocol;

a step of thread monitoring, configured to perform real-time monitoring on the thread when transmitting based on the UDP protocol, and retransmit a lost packet data;

a step of processing expired data, configured to discard the expired data in the network teaching system to ensure the network transmission smooth; and a synchronous displaying step, configured to realize synchronous display on the student user terminal for receiving data.

Figure 5:
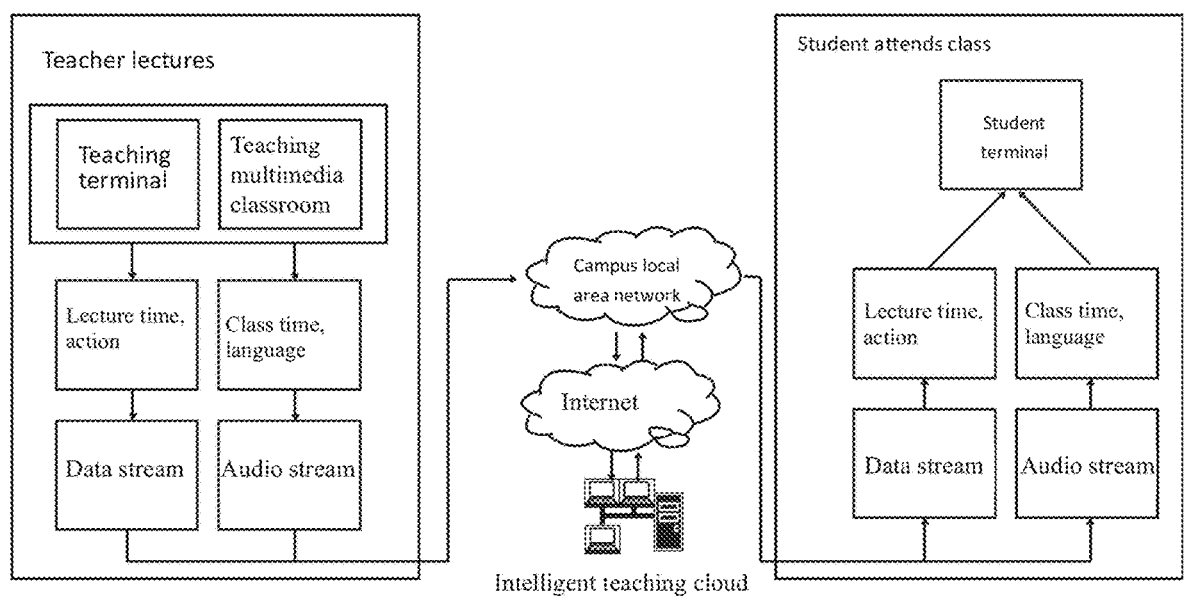
FIG. 5 is a schematic diagram of the basic steps of a synchronous displaying method according to the present disclosure.

As shown in FIG. 5, the acquisition of the synchronous data and the basic data transmission mode of synchronous displaying are schematically shown. Using the synchronous displaying method of the present disclosure, lecture time and action data stream, class time and language data stream are respectively obtained from the teaching user terminal and the teaching multimedia classroom by the teacher in class. By means of connection between the campus local area network and the Internet, the data is obtained and processed through the Internet by an intelligent education cloud server, and is distributed through the Internet and the campus local area network to the student terminal for providing services for students.

For each of the above steps:

A step of starting a teacher user terminal is prepared to acquire data for synchronous displaying. The image synchronous displaying method of the present disclosure is based on a network teaching system. The system starts an image synchronous displaying program when the client of the teacher user terminal is activated to enter a working state.

A same screen displaying data acquisition step is acquiring the same screen display image data for image synchronous displaying.

The ways of acquiring image data can be various, including a screenshot image, an image acquired by a camera or a photographic apparatus, an image acquired by a scanner, etc. Content on the image includes teachers' blackboard-writing, a screenshot image obtained from an electronic whiteboard or a photographed image; a photographed image obtained from an ordinary blackboard; can be a screenshot image or a photographed image input through a tablet and displayed on a screen; an image of a text photograph or the like input by using a scanner and a screenshot image integratedly displayed on the teacher user terminal.

Commonly used image formats include JPEG, BMP, GIF, PNG, TIFF, etc., relatively speaking, JPEG (Joint Photographic Experts Group) and BMP (Bitmap) are the most widely used.

BMP is a hardware-independent image file format, which can be called a device-independent bitmap. BMP adopts a mapping storage format; and no other compression is used besides an optional image depth, so a BMP file occupies relatively large storage space, which belongs to standard image formats in the Windows environment, but its size is too large to be transmitted via the network.

A typical BMP image file consists of four parts: a bitmap file header data structure, which contains BMP image file type, displaying content, and other information, whose structure is generally a fixed length of 14 bytes; a bitmap information data structure, which contains width, height, compression method, defining color and other information of the BMP image, whose structure length is generally a fixed length of 40 bytes; a palette that is an optional part; bitmap data, where content of this part varies with the number of bits BMP bitmap used, and the RGB is used directly in 24-bitmap.

BMP is seen as a common format of bitmap. If an image originally obtained is not in a BMP format, the format should be converted into a BMP format, and then the BMP image is compressed into a JPEG image.

The network teaching system of the present disclosure can automatically perform screen intercepting or obtaining in real time according to rules. For example, the screen display content or photographing content to be displayed synchronously is automatically intercepted every few seconds, or screen display content or photographing the relevant content is manually and randomly intercepted according to the self-judgments and/or teaching requirements by teachers, so that the BMP image needs to be synchronously displayed is obtained.

Typically, content of these BMP images is content displayed on the teacher user terminal. This content is typically teacher's blackboard-writing content obtained in various forms, which, for example, may be a blackboard-writing image on an electronic whiteboard, and may be blackboard-writing content photographed on an ordinary whiteboard.

In accordance with the present disclosure, manners in which screenshots are obtained include:

(A) intercepting the BMP image of a current operation page by rewriting the android system screenshot component;

(B) intercepting the BMP image by shooting a scene of an area selected by teachers by using a high-speed camera;

(C) intercepting the BMP image of a blackboard-writing written by a whiteboard pen by command controlling;

The same screen application data acquisition step is acquiring the same screen application operation instruction data for synchronous display.

For data which is unnecessary to be displayed directly on the same screen, the same screen application operation information that needs to be displayed synchronously can be obtained by transmitting an instruction and coordinate point data, and then the image synchronous displaying is realized by operation reproduction.

Specifically, as regards content such as blackboard-writing drawn by the teacher user terminal, path coordinate data of the blackboard-writing trajectory is sent while the teacher user writes blackboard-writing on the APP on the terminal, and after the path coordinate data is obtained by the student user terminal, echo is realized by redrawing coordinates by using instructions, without obtaining the entire displayed image information.

As regards instruction extraction and machine learning: a system machine learning ability is firstly built; various file operation instructions are recorded by a dictionary table; and practical execution languages corresponding to the operation instructions are pointed at through index matching. In particular, as regards different classifiers (weak classifiers) trained in the same training set, these weak classifiers are assembled to form a stronger final classifier (a strong classifier).

The method itself is achieved by changing data distribution, a weight value of each sample is determined on the basis of whether classification of each sample in every training set is correct as well as accuracy of the previous overall classification. The new data set with the modified weight value is sent to the lower classifier for training. Finally, classifiers obtained by each training are merged to form a final decision classifier.

Instruction extraction machine learning allows more effective instructions to be saved to a database through system automatic judgment, and invalid instructions are deleted, so that a class process is more complete, and data stored in the database is more effective.

Figure 1:
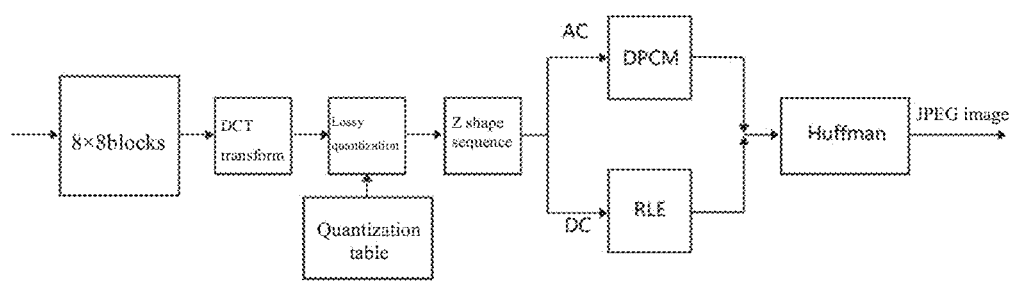
FIG. 1 is a JPEG image compressing step in the existing solution.
Figures 1, 6:
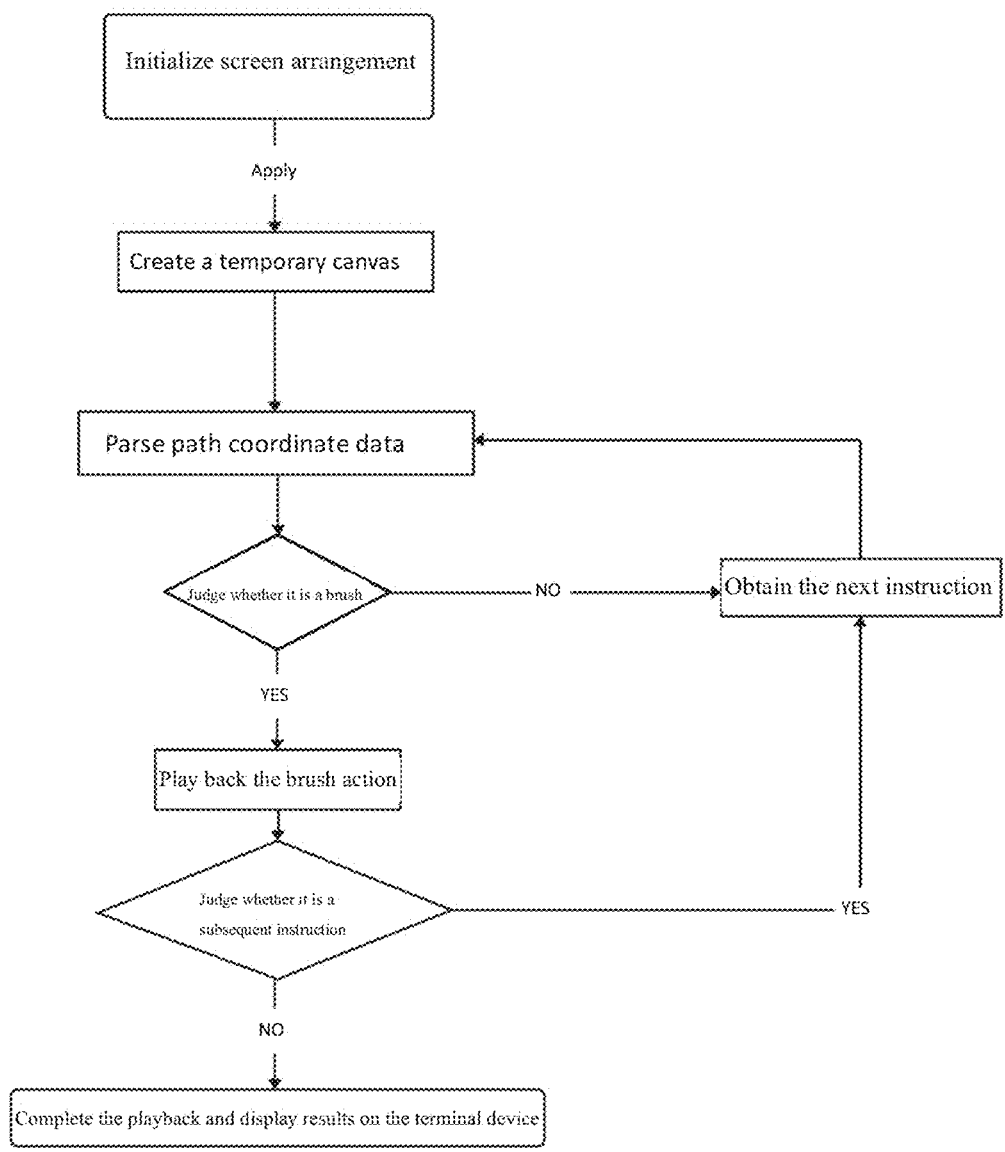
Figures 2, 6:
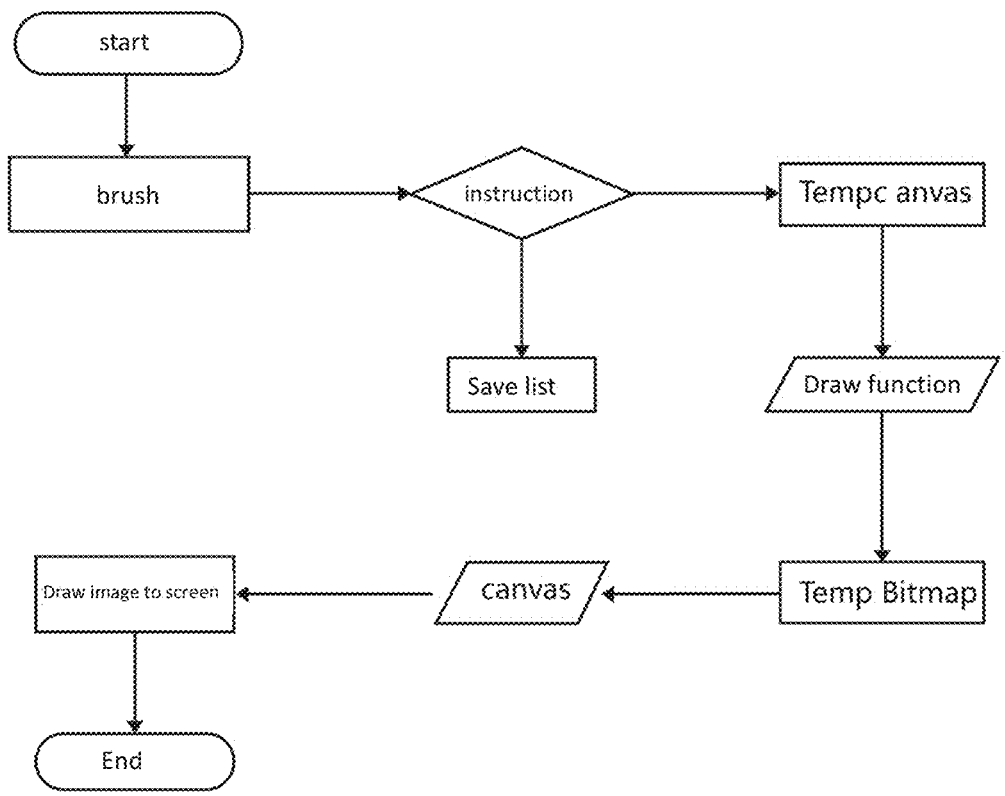
Figures 3, 6:
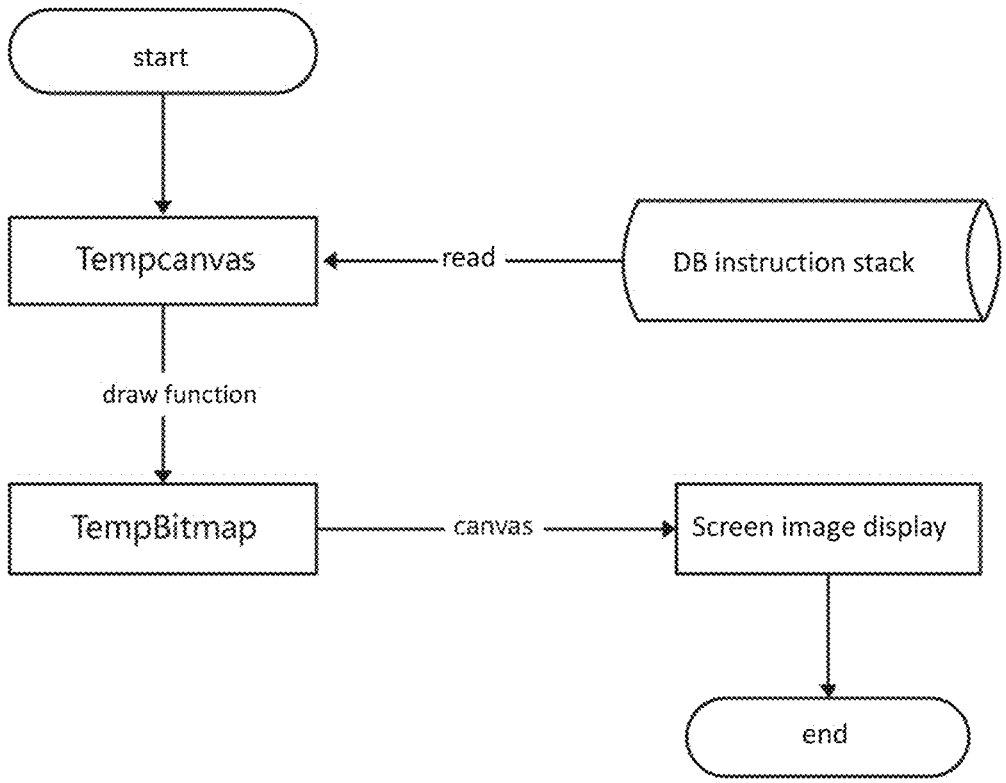

FIG. 6-1 to 6-3 are schematic diagrams of a process of obtaining path coordinate data according to the present disclosure. When acquiring the path coordinate data, the following steps could be used: initializing screen arrangement; applying to create a temporary canvas; parsing path coordinate data; determining whether it is a brush; playing back the brush action if yes, otherwise, obtaining the next instruction; determining whether there is a subsequent instruction after playing back the brush action is completed; and keeping on obtaining the next instruction if yes, otherwise, completing the playback and displaying results on the terminal device.

Specifically, the recording process of the path coordinate data is as follows:

A1: parsing the recorded path coordinates data, and storing it to a temporary instruction coordinate stack, and then making an initial arrangement on the screen, and setting a background pattern on a canvas of the screen;

A2: creating a new Bitmap, and using this Bitmap to generate a temporary canvas temptCanvas;

A3: setting the background of tempBitmap to transparent for the purpose of locating the target of the temporary canvas temptCanvas in the created tempBitmap;

A4: after such structure, extracting the coordinate instructions from the instruction stack and restoring them one by one, a corresponding image being drawn on the temporary tempBitmap by all draw functions of the temptCanvas through rewriting performed by means of the temptCanvas, so that in an action backtracking process, draw points, draw lines call the temptCanvas instead of the Canvas originally on the screen, comprising temptCanvas. drawPoint and temptCanvasRect; and A5: after execution of all the instruction coordinate stacks, executing Canvas.drawBitmap (tempBitmap,0,0, null), wherein the temptCanvas is responsible for drawing various brush marks on the tempBitmap, whereas the Canvas is responsible for drawing tempBitmap on the screen.

The reference point of the Bezier curve is set by the middle position of two consecutively introduced coordinate points, and then the Bezier algorithm is used for smoothing to plot multiple points as a smooth curve. The final coordinate point is set as the starting point of the subsequent operation reference point, and the path is stored in a path set.

The logical steps described by the action are as follows, where the (float x, float y) parameters introduced by a touchMove function are respectively horizontal and vertical axis coordinates:

```
private void touchMove (float x, float y) {
    if (null! = This.mPathPaint) {
        float dx = Math.abs (x - this.mPreviousX);
        float dy = Math.abs (y - this.mPreviousY);
        // when the distance between the two points is greater than or equal to 3, the Bezier plotting curve is generated
        if ((dx> = DEFAULT_TOUCH_TOLERANCE) || (dy> = DEFAULT_TOUCH_TOLERANCE)) {
            // the operating point of the Bezier curve is set to half of the starting point and end point
            float cX = (this.mPreviousX + x) / 2.0F;
            float cY = (this.mPreviousY + y) / 2.0F;
            // quadratic Bezier algorithm is executed to achieve a smooth curve: previousX, previousY are the operating points, cX, cY are the end points
            this.mPath.quadTo (this.mPreviousX, this.mPreviousY, cX, cY);
            if (!IsEraser ( )) {
                this.mCanvas.drawPath (this.mPath, this.mPaint);
            }
            // when executed for the second time, the coordinate value of the first call is used as the initial coordinate value of the second call
            this.mPreviousX = x;
            this.mPreviousY = y;
            this.mPathPaint.addPathPoint(x,y);
        }
    }
}
```

Figure 7:
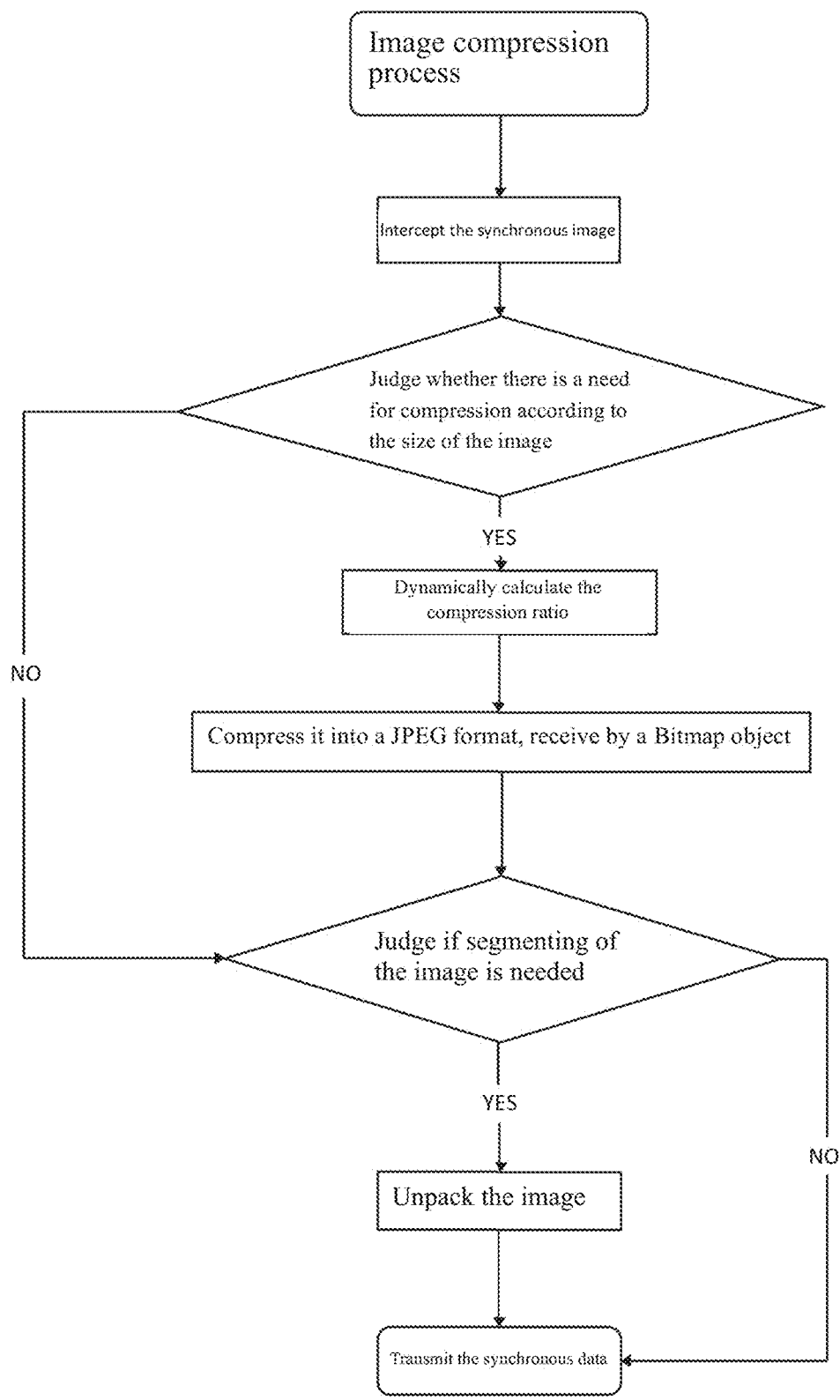
FIG. 7 is a schematic diagram of an image compression process according to the present disclosure.

As shown in FIG. 7, the image compression step that compresses the acquired same screen display image data using a JPEG format, further includes image primary compression and image secondary compression. The basic steps of the secondary compression include: intercepting the synchronous image; determining whether there is a need for compression according to the size of the image; dynamically calculating the compression ratio if yes, and compressing into the JPEG format if necessary, otherwise, directly entering an image segmenting and judging step; and if segmenting is needed, unpacking the image, and if not, directly entering a synchronous data transmission step. Specifically, 1. Image Primary Compression Since the maximum lengths of data packets transmitted in a multicast-to-unicast are limited, it is required to first decode and convert the image into a specific JPEG format image, and dynamically calculate the compression ratio according to the size of the image at the time of conversion to execute the image primary compression. It is received by a Bitmap type object, and converted into fragments for multicast transmission in local area networks.

In general, image compression includes: Differential Pulse Code Modulation (DPCM), Discrete Cosine Transform (DCT), Vector Quantization (VQ) coding, and other techniques. At present, international image compression standards based on the DCT and other techniques include JPEG, MPEG, H261 and so on.

On the basis of the existing DCT technique and with further improvement, transmitted video stream, image file encapsulated with a plurality of images or the size of an image file can be reduced by the image compression of the present disclosure.

The image primary compression further includes the steps of:

first, before executing the image compression step, uncompressed image data is backed up to form an original image backup database, and when users receive the compressed image and need to view a finer image, an original image can be downloaded from the original image backup database by a click operation;

Besides, after executing the step of determining image transmission, the original backup data of the compressed image that is determined not to be synchronously displayed to the student user terminal is deleted from the database.

1-1. Forward Discrete Cosine Transform (FDCT)

An RGB color system is the most commonly used way to represent colors, what the BMP bitmap uses is the RGB color system. Three components R, G, and B respectively represent three primary colors of red, green and blue. And the JPEG that the image is to be transformed into adopts a YCbCr color system, and the three image components Y, Cb, and Cr respectively represent luminance, chrominance, and saturation. In dealing with full-color images, RGB color mode image data should be converted into YCbCr color mode data first.

Discrete cosine transform (DCT) transforms a group of light intensity data into frequency data to obtain the intensity transformation situation, which belongs to lossless transformations. DCT transform distinguishes each frequency information in the image, and then retains visually sensitive high-frequency part information, sets the low-frequency part that cannot be perceived by the video to zero numerically, so as to achieve the purpose of image compression. Through DCT transforms, energy can be concentrated on a few eigenvalues, which are generally DC eigenvalues and AC eigenvalues.

During the DCT transform, the image is first decomposed into N×N pixel blocks (or called sub-image blocks), where preferably N=4, 8, or 16, and most preferably N=8, separate two-dimensional DCT transforms are taken out for each sub-image block. In the present disclosure, an 8×8 decomposition method is preferably used. When the length of an original image is not a multiple of 8, it is required to complement it to a multiple of 8. Thus, the amplitudes of the two-dimensional spatial frequency component of 64 pixels are called DCT eigenvalues, namely, each sub-image block can be represented by 1 DC eigenvalue and 63 AC eigenvalues.

For a digital image represented by using a pixel matrix (a square matrix), the following formula is used for the two-dimensional DCT positive transform:

$$F(u, v) = \frac{2}{\sqrt{2N}} c(u)c(v) \sum_{x=0}^{N-1} \sum_{y=0}^{N-1} f(x, y) \cos\left(\frac{2x+1}{2N} u\pi\right) \cos\left(\frac{2y+1}{2N} v\pi\right) \quad (1)$$

$$F(u, v) = \frac{1}{4} c(u)c(v) \sum_{x=0}^{7} \sum_{y=0}^{7} f(x, y) \cos\left(\frac{2x+1}{16} u\pi\right) \cos\left(\frac{2y+1}{16} v\pi\right) \quad (2)$$

The following formula is used for the inverse transform of the two-dimensional DCT (IDCT transform):

$$f(x, y) = \frac{1}{\sqrt{2N}} \sum_{u=0}^{N-1} \sum_{v=0}^{N-1} c(u)c(v) F(u, v) \cos\left(\frac{2x+1}{2N} u\pi\right) \cos\left(\frac{2y+1}{2N} v\pi\right) \quad (3)$$

$$f(x, y) = \frac{1}{4} \sum_{u=0}^{7} \sum_{v=0}^{7} c(u)c(v) F(u, v) \cos\left(\frac{2x+1}{16} u\pi\right) \cos\left(\frac{2y+1}{16} v\pi\right) \quad (4)$$

In the above two formulas, u and v are the coordinate positions of a certain value in the matrix after the DCT transform, namely, the frequency domain sampling values, where u=0, 1, ..., N−1, and v=0, 1, ..., N−1; F (u, v) is the frequency eigenvalue at the (u, v) position in the matrix after the DCT transform; (x, y) is the coordinate position of a certain value in the image data, i.e. the spatial domain sampling value, where x=0, 1, ..., N−1, and y=0, 1, ..., N−1;

F (x, y) is the pixel value at the (x, y) position in the image data; when u=0 and v=0, c(u), $$c(v) = \frac{1}{\sqrt{2}};$$

and when u>0 or v>0, c(u), c(v)=1.

Natural numbers of the matrix data after the DCT transform are frequency eigenvalues, the value of F (0,0) is the largest among these eigenvalues, i.e. the DC eigenvalue, and the remaining 63 frequency eigenvalues are mostly positive and negative floating-point numbers close to zero, collectively referred to as the AC eigenvalues.

Two-dimensional DCT transform is separable, i.e. two-dimensional transform can be decomposed into two one-dimensional transforms in series, that is because speed efficiency of the one-dimensional DCT transform is higher than the two-dimensional DCT transform. Hence, the computing processing efficiency can be improved by separation calculation, whereby for the forward transform formula, it can be rewritten as:

$$F(u, v) = \sqrt{\frac{2}{N}} c(v) \sum_{y=0}^{N-1} \left[ \sqrt{\frac{2}{N}} c(u) \sum_{x=0}^{N-1} f(x, y) \cos\left(\frac{2x+1}{2N} u\pi\right) \right] \cos\left(\frac{2y-1}{2N} \pi\right) \quad (5)$$

Namely, the one-dimensional DCT transform is first performed along each column of the image to obtain $$f(u, y) = \sqrt{\frac{2}{N}} c(u) \sum_{x=0}^{N-1} f(x, y) \cos\left(\frac{2y+1}{2N} v\pi\right) \quad (6)$$

And then the one-dimensional DCT transform is performed for the second time along each row of f(u, y) to obtain $$F(u, v) = \sqrt{\frac{2}{N}} c(v) \sum_{y=0}^{N-1} f(u, y) \cos\left(\frac{2v+1}{2N} v\pi\right). \quad (7)$$

Thus, the two-dimensional DCT transform can be quickly calculated by utilizing the one-dimensional DCT transform.

1-2. Quantization (Quantization)

Quantization is removing redundant information which has little effect on a visual effect of the image while maintaining a certain image quality. In view of the frequency eigenvalues after the FDCT transform, the aim is to reduce the amplitude of the non-zero eigenvalues and increase the number of "zero" eigenvalues. Quantization is the main reason for image quality degradation.

For JPEG lossy compression, quantization is performed using a linear uniform quantizer, in particular, which is accomplished by dividing the 64 DCT eigenvalues by quantization step and rounding them off. The quantization step is determined in accordance with a position at which the eigenvalue is located and a hue value of each color component. Because the human eye is more sensitive to a luminance signal than to a chromatic difference signal, two quantization tables are used: a luminance quantization value and a chrominance quantization value. In addition, since the human eye is more sensitive to the image of low-frequency component than to the image of high-frequency component, the quantization step of the upper left corner in the image is smaller than the quantization step size of the lower right corner.

As shown in FIG. 8, values of the luminance quantization table and chrominance quantization table are optimal for a CCIR 601 standard television image. If these two tables are not utilized, they could be replaced with other quantization tables as needed. If the same quantization table is utilized in each sub-image block, the amount of calculation will be reduced, but the optimum compression effect may not be achieved due to different situations of sub-image blocks.

1-3. Zigzag Scan (Zigzag Scan)

The quantized AC eigenvalues generally have many zero values and need to be rearranged in a zigzag path in order to increase the number of consecutive "0" eigenvalues, namely, a stroke length of "0". In this way, the 8×8 matrix is turned into a 1×64 vector, and the lower frequency eigenvalues are put at the top of the vector.

As shown in FIG. 9, sequence numbers of the DCT eigenvalues after the zigzag scan are shown. 0 represents a zero frequency DC eigenvalue, and the remaining 1-63 are AC eigenvalues. The larger the eigenvalues are, the higher the frequency of a frequency component corresponding to the position, and the subsequent quantization coding is based on these eigenvalues.

1-4. The Quantized DC Eigenvalue is Coded by Utilizing Differential Pulse Code Modulation (DPCM).

After the zigzag scan, the quantized DC eigenvalue has two features: one is that the value of the eigenvalue is relatively large, and the other is that the DC eigenvalues of the adjacent 8×8 image blocks are of little change. According to this feature, the difference (Delta) of the quantized DC eigenvalues between the adjacent image blocks is coded using the DPCM technique: Delta=DC(0,0)k−DC(0,0)k−1.

1-5. The Quantized AC Eigenvalue is Coded Using Run Length Encoding (RLE)

RLE is a typical lossless compression technique. When there are many modules of the same color in an image, and each row of the modules has the same color, storage of the color value of each pixel is generally not advocated for this kind of image, but it is enough to simply store the pixel number and the color value of the same color. For example, a string RRRRRGGGBBBBB representing the color pixel value, may be replaced with 5R3G5B after the RLE compression.

After the zigzag scan, feature of the quantized AC eigenvalue is that the 1×64 vector contains many "0" eigenvalues, where many "0"s are consecutive, so they are coded by using rather simple and intuitive RLE.

JPEG standard uses the upper 4 bits of 1 byte to represent the number of the consecutive "0"s and uses the lower 4 bits of it to represent the number of bits needed to code the next non-"0" eigenvalue, and what follows it is a value of the quantized AC eigenvalue.

The coding format is (symbol 1) (symbol 2), where the symbol 1 represents two pieces of information, i.e. run and length. The run is the number of bits of the consecutive "0" values of the AC eigenvalue located in front of the non-zero AC eigenvalue in the zigzag matrix.

The length is the number of bits used to code the amplitude of the AC eigenvalue. The symbol 2 represents the amplitude of the AC eigenvalue.

1-6. Entropy Coding (Entropy Coding)

Entropy coding is a lossless coding based on statistical characteristics of the quantized eigenvalues. Common coding includes Run Length Encoding, Huffman coding, and arithmetic coding. Run Length-Huffman coding (RL-VLC) is the commonly used coding method in an image compression coding international standard of JPEG, is mainly used for entropy coding of AC eigenvalues. A JPEG standard Huffman coding table is generated by, after the 8×8 image block is transformed by the two-dimensional DCT and scanned by zigzag, the joint distribution probability of Level, the amplitude dimension of the non-zero AC eigenvalue and Run, the previous "0" run length of the AC eigenvalue, namely, a (Run, Level) number pair.

In the JPEG lossy compression method, the Huffman coding is used to reduce the entropy. The reason for using the Huffman coding is that coding can be performed by using a simple Lookup Table method, where the looked-up table is a Huffman coding table. While coding, different Huffman coding tables are used for 1 DC value and 63 AC values of each matrix data, and different Huffman coding tables are also required by luminance and chrominance. When compressing data symbols, Huffman coding assigns relatively short codes to symbols of higher-frequent occurrence and relatively long codes to symbols of lower-frequent occurrence. This variable length Huffman coding table can be defined in advance. In the present disclosure, the DC eigenvalue after the DPCM coding and the AC eigenvalue after the RLE encoding may be further compressed by using the entropy coding.

The differential DC eigenvalue and each AC eigenvalue are encoded by using two symbols, i.e. symbol 1 and symbol 2. For the DC eigenvalue, information represented by the symbol 1 is referred to as length, i.e., the number of bits used to code the amplitude of the DC eigenvalue, and the symbol 2 represents the amplitude of the DC eigenvalue. For the AC eigenvalue, the symbol 1 represents two pieces of information, called Run and Length. The run is the number of bits used to encode the amplitude of the consecutive "0" values of the AC eigenvalue located in front of the non-zero AC eigenvalue in the zigzag matrix. The symbol 2 represents the amplitude of the AC eigenvalue.

If the student user terminal performs transmission according to the original image, while definition of the image transmitted by the teacher user terminal is possibly very high, it would inevitably result in excessive demand of network resources and even network congestion, and other data cannot be transmitted. So a series of transforms are carried out to obtain an image adaptive for the screen size. Files are transferred in a limited bandwidth, making a class process smoother.

2. Image Secondary Compression (Unpacking)

After the primary compression, if the image size is still greater than the value dictated by the protocol, the second compression or called unpacking is required.

The bit data stream obtained by the above-mentioned processing constitutes a compressed image, and then the compressed image is subjected to further differentiation processing. In the following further differentiation processing, a further compression ratio is set in accordance with the image size in combination with (a minimum value, a maximum value): {minSizemaxSize} of the number of file bytes specified by the system in consideration of the differentiation method:

```
If (image.getBytes ( )>maxSize)
{Compression ratio = image.getBytes ( ) / maxSize * system-defined
offset}
Else,
{Compression ratio = 1}.
```

Herein, the differentiation method refers to that: the size of each image processed by the system is different, but the length of each message is limited (generally about 1500 bytes) during the data transmission based on the UDP protocol. Therefore, in the process of processing the images of different sizes, differentiation among the image file sizes requires to be considered; the maxSize of the image is specified in the system; a further compression processing is started if the image size is greater than the number of bytes, namely, the image is further compressed by using the compression ratio calculated by the formula.

The 1500 bytes refers to the size of a single data message when the UDP transmits data. Different network devices are slightly different. In the actual transmission process, each image is automatically sub-packaged according to the size and is transmitted, and the client will carry out combination processing on the data after receiving the corresponding message; in addition, if the length of an original packet sent by the UDP protocol is excessively long, which is more than 65K or so, the UDP protocol cannot properly segment the data packet, and the second manually unpacking of the data is required to ensure the UDP protocol normally send data messages each time. The image compression ratio is obtained according to the size of the image composed the compressed image and {minSize, and maxSize} of the specified file number of bytes:

If the size of the image is greater than the maximum, Compression ratio=image size/maximum*system-defined offset, where for the hardware platform display resolution used in the present disclosure, the offset is set as 0.4 to 0.6, and the correspondence is referred to in Table 1 below. Otherwise, the compression ratio=1.

TABLE 1

| resolution | Offset |
| --- | --- |
| above 1920 * 1080 | 0.6 |
| 1280 * 720 | 0.5 |
| below 800 * 600 | 0.4 |

A displayed image quality varies with different resolutions of mobile device, and a mobile device with a low resolution may display an image of a slightly inferior quality. Therefore the offset is proportional to the resolution according to the data given in Table 1. The compression ratio is implemented according to the following steps:

(a) capturing a screenshot of an electronic blackboard-writing during a teachers' class by an application program on the teacher user terminal;

(b) calculating an appropriate compression ratio based on the resolution of the teacher user terminal; and (c) transforming the image format according to the compression ratio, i.e., the primary compression.

By means of two image compression, fast and efficient compression, comparison, and transmission are achieved.

In the image primary compression step, and in the FDCT transform process, the natural number of the matrix data after the DCT transform is the frequency eigenvalue, value of F (0,0) is the largest among these eigenvalues, namely, the DC eigenvalue, and the remaining 63 frequency eigenvalues are mostly positive and negative floating-point numbers close to zero, collectively referred to as AC characteristic values.

In the image compression process according to the present disclosure, the DC eigenvalue and AC eigenvalue which constitute a main factor of the image are extracted and stored in other files independent of the image file being compressed without affecting the image primary compression.

Generally, outline distribution, color distribution, and DC and AC values of the image should be comprehensively considered in comparing images. However, in the present disclosure, the DC and AC eigenvalues of the image obtained in the compression process by using JPEG not only affect the image compression processing, but also judge whether there are changes in two adjacent images by simply comparing eigenvalues of the two adjacent images, and decide whether to send the compressed image to the student user terminal according to the judgment result.

Amount of system computation is reduced by this simplified judgment method due to characteristics that a screen displaying content, especially an electronic blackboard-writing content while teachers' lecturing is usually in continuous changes; in adjacent time such as in a few seconds, the blackboard-writing content may not change or increasingly change; and the apparatus to acquire the image, the image displaying environment, the background contour, and other information are basically the same.

It can be found that whether there are changes between the two adjacent images through the simple comparison, and whether the image should be synchronously transmitted to the student user terminal. If the image content has not changed, the transmission is not needed.

Since screen copying, acquiring and compression processing of the image are normally performed in a fixed time interval, once it is determined that the image needs to be transmitted based on the comparison and judgment results, the compressed image data is directly segmented and transmitted without delay in time, and once it is determined the image need not to be transmitted based on the judgment result, network resources are not taken up and the student user terminal does not have to repetitively update the adjacent same displaying content, which affects user experience.

Indeed, the present disclosure does not preclude comprehensive comparison and judgment of two consecutively obtained images, so as to obtain a more comprehensive comparison result.

Specifically, the difference value of the two images is judged by calculating the distance between the two images, namely, the sum of difference values between components of the DC and AC eigenvectors. The difference is the comparisons between the DC and AC eigenvalues (eigenvector values) of the two adjacent images; as regards the DC eigenvalue, comparing signs of the components, marking as 1 if the signs of the components are the same, otherwise, marking as 0;

As regards the AC eigenvalue, and according to a set contrast threshold, marking as 0 if the difference between the components exceeds the contrast threshold, otherwise, marking as 1.

Calculate the number of 0s or 1s thereby, and sum to obtain the difference value between the two adjacent images.

The greater the number of 0s indicates the greater the difference between the eigenvectors and the greater the difference between the images.

Further, if there is no difference between the two images, which indicates the two adjacent screenshots of the image are the same or basically the same, the same screen transmission is not required; if there are differences in value, which indicates there are changes in the contents of the two screenshots, the corresponding compressed image is transmitted to the student user terminal by the teacher user terminal.

The determination of whether there is a difference can be made by comparison and judgment based on the set threshold value, or the threshold value is not necessarily set, and synchronous transmission is performed once there exists a difference.

A plurality of storage files for storing the copied-and-saved DC and AC eigenvalues are set, another storage file is used when one folder is full, and then the system clears the full folder for backup.

Time of intercepting the screen image content is gradually and automatically prolonged when no change is, in a long time, detected between screen contents intercepted consecutively. For example, every few seconds is extended to every dozens of seconds, or even a few minutes.

According to basic characteristics of teaching process, especially of blackboard-writing, the difference values of a plurality of continuous and consecutive images in a period of time, such as in a course time, are made into a curve, and current screen content is marked as first edition blackboard-writing content when the difference value is detected to keep basically stable within a certain range; and a starting of a new layout blackboard-writing or new displaying content is judged when a relatively large change in the difference value is detected.

The received synchronous image data is saved as a reproducible video stream by the student user terminal, so that the learning content could be reviewed at any time. More preferably, a play of the video stream and the teachers' audio recording are matched based on the time characteristic (such as timestamps generated by the teaching system) to form a matched play with a voice stream and a video stream.

Through the judgment step, automatic discrimination and real-time transmission of the image which needs to be displayed synchronously are realized, and purposes of synchronous screenshot, real-time compression, synchronous judgment, and automatic transmission are achieved.

Note that after executing the subsequent step of determining image transmission, the original backup data of the compressed image that is determined not to be synchronously displayed to the student user terminals is deleted from the database.

A step of segmenting the image determined to be transmitted segments the compressed image data determined to be transmitted to form a transmission data packet.

When the compressed JPEG image and the same screen application data packet are greater than the limited length of the message, segmenting the JPEG image and the same screen application data packet into several sub data packets according to the equal ratio of the message, i.e., the JPEG image and the same screen application data packet are segmented into several temporary TMP files; the segmented temporary TMP files are transmitted through the network in a multicast mode; and after the student user terminal obtain all the segmented TMP files, the segmented TMP files are merged to form a complete JPEG image, so as to be locally displayed on the student user terminal.

Specifically, when the UDP data message is transmitted, the multicast message is automatically sub-packaged according to the length of the transmitted data packet to prevent transmission failure due to an excessively large data packet. However, if the sub-packaged UDP data is excessively small, a large amount of data is broadcasted in a short period of time, which brings relatively great pressure to the network in the LAN. The data is dynamically calculated and segmented according to the data length, with no more than 16,000 bytes per single data message. According to the present disclosure, the infinite AP bandwidth occupancy rate and the response speed are evaluated based on the results of repeated debugging attempts, and the obtained optimum value is 16,000 Bytes, and the maximum number of segments is no more than five of such two sets of conditions for comprehensive calculation to obtain a relatively better message array for transmission.

Figure 10:
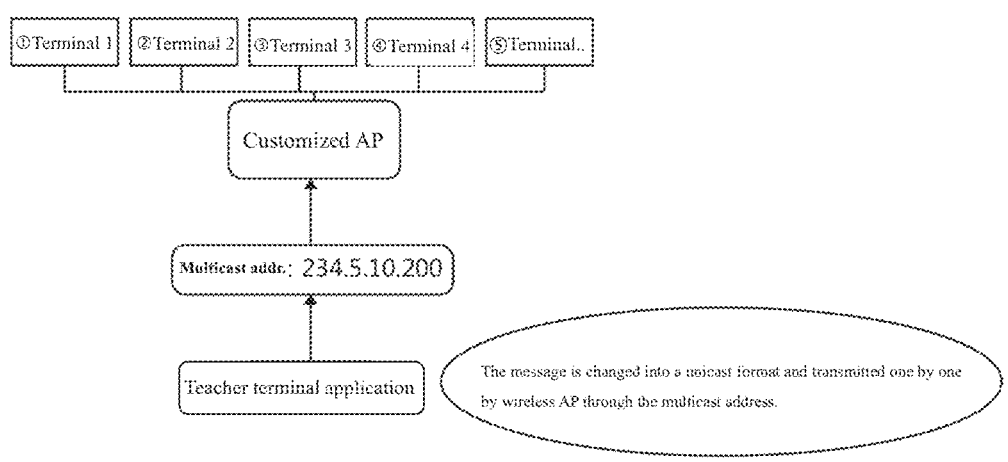
FIG. 10 is a schematic diagram of a data transmission architecture based on the UDP protocol according to the present disclosure.

The specific operation process of the synchronous data segmenting step is as follows:

As shown in FIG. 10, the step of transmitting a data packet transmits the data packet to a plurality of user terminals in a multicast mode based on the UDP protocol. Messages to be forwarded are changed into a unicast format and transmitted one by one by wireless AP through the multicast address. The teacher-terminal application transmits the messages to multiple terminals by a customized AP via the multicast address 234.5.10.200.

A wireless access point, i.e. a wireless AP (Access Point), is a wireless switch used in a wireless network and the core of the wireless network. The wireless AP is an access point for mobile computer users to access a limited network.

As a kind of communication way parallel to unicast and broadcast, a multicast technique effectively solves the problems of single point transmitting and multipoint receiving, and is widely used in real-time data transmission, multimedia conferences, data simulation, and other fields. The multicast is to transmit an IP data packet to "a group" of addresses, so that the data packet can reach all members of the same group on the Internet, where the "group" is a special IP address identification. The IGMP protocol of TCP and IP contains content of multicast. The protocol specifies that the address used by the multicast is from 224.0.0.0 to 239.255.255.255. The multicast addresses from 224.0.0.0 to 239.0.0.255 are used for storing multicast routing information. Multicast addresses out of this range are set for application programs.

UDP (User Data-gram Protocol) is a connectionless protocol based on an IP protocol. It is mainly used for supporting network applications that need to transmit data between computers. Because it does not provide data retransmission and confirmation, its advantage is fast transmission speed, and the disadvantage is low reliability. The UDP protocol is used by a large number of network applications in a client/server mode, including network video conferencing systems. A UDP message includes two parts: a header and a data field. The header of UDP consists of four fields, each of which occupies two bytes: a source port number, a destination port number, a datagram length, and a check value. The UDP datagram is transmitted through a source port by a data sender, and the data is received by a data receiver through a destination port.

The size of the data packet sent by the UDP each time generally does not exceed 2048 bytes. A transmission buffer is determined in the sending terminal and the receiving terminal, and its size is 65,536 bytes. The sending terminal first writes a frame of video data into the buffer and segments it into several data packets, so that the size of each data packet does not exceed 2048 bytes, which is called packet data. A header structure is added to each data packet of each packet data, where the header structure defines a serial number, a transmission channel number, a video compression format, and a timestamp. Datagram length field is mainly used for calculating the data part of the variable length. The maximum length of the datagram including the header is theoretically 65,536 bytes, and in a practical application, a lower value is generally chosen such as 1024 bytes.

UDP is built based on the IP protocol, but relative to the IP protocol, the increase of ports for providing protocol ensures process communication, the entire UDP message is encapsulated in the IP datagram and transmitted. However, the problem of the UDP protocol is that the protocol itself does not have an error retransmission mechanism and detection and processing of errors are performed in the application program.

According to different ways of receivers to process multicast sources, multicast models include the following: the ASM (Any-Source Multicast) model, the SFM (Source-Filtered Multicast) model, the SSM (Source-Specific Multicast) model.

(A) the ASM Model

In short, the ASM model is any source multicast model. In the ASM model, any sender could be a multicast source and send information to a certain multicast group address. Many receivers obtain the multicast information addressed to the multicast group by joining the multicast group identified by the multicast group address. In the ASM model, receivers cannot know a location of the multicast source in advance, but can join or leave the multicast group at any time.

(B) The SFM Model

The SFM model inherits the ASM model. From a sender's perspective, memberships of multicast groups of those two are totally the same. Meanwhile, the SFM model extends the ASM model functionally. In the SFM model, upper-layer software checks the source addresses of the received multicast packets and allows or disables the messages from certain multicast sources. Therefore, receivers can only receive multicast data from part of the multicast sources. From a receiver's perspective, only part of the multicast sources is valid, and the multicast sources are filtered.

(C) The SSM Model

In a real situation, users may only be interested in the multicast information sent by certain multicast sources, rather than receiving information from other sources. The SSM model provides users with a transmission service which can specify a multicast source at a user terminal. A fundamental difference between the SSM model and the ASM model lies in that the receiver in the SSM model has already known the specific location of the multicast source by other means. The SSM model uses a multicast address range different from that of the ASM/SFM model to directly set up a dedicated multicast forwarding path between the receiver and the multicast source designated thereby.

A server need not be used for local area network transmission. In the present disclosure, the teacher user terminal and the student user terminal are connected to the same network segment through the AC routing (802.11 AC, the fifth generation wireless network standard, commonly known as the 5G WIFI). Indeed, Peer-To-Peer (P2P) technology could also be employed for the same screen data transmission.

Figure 11:
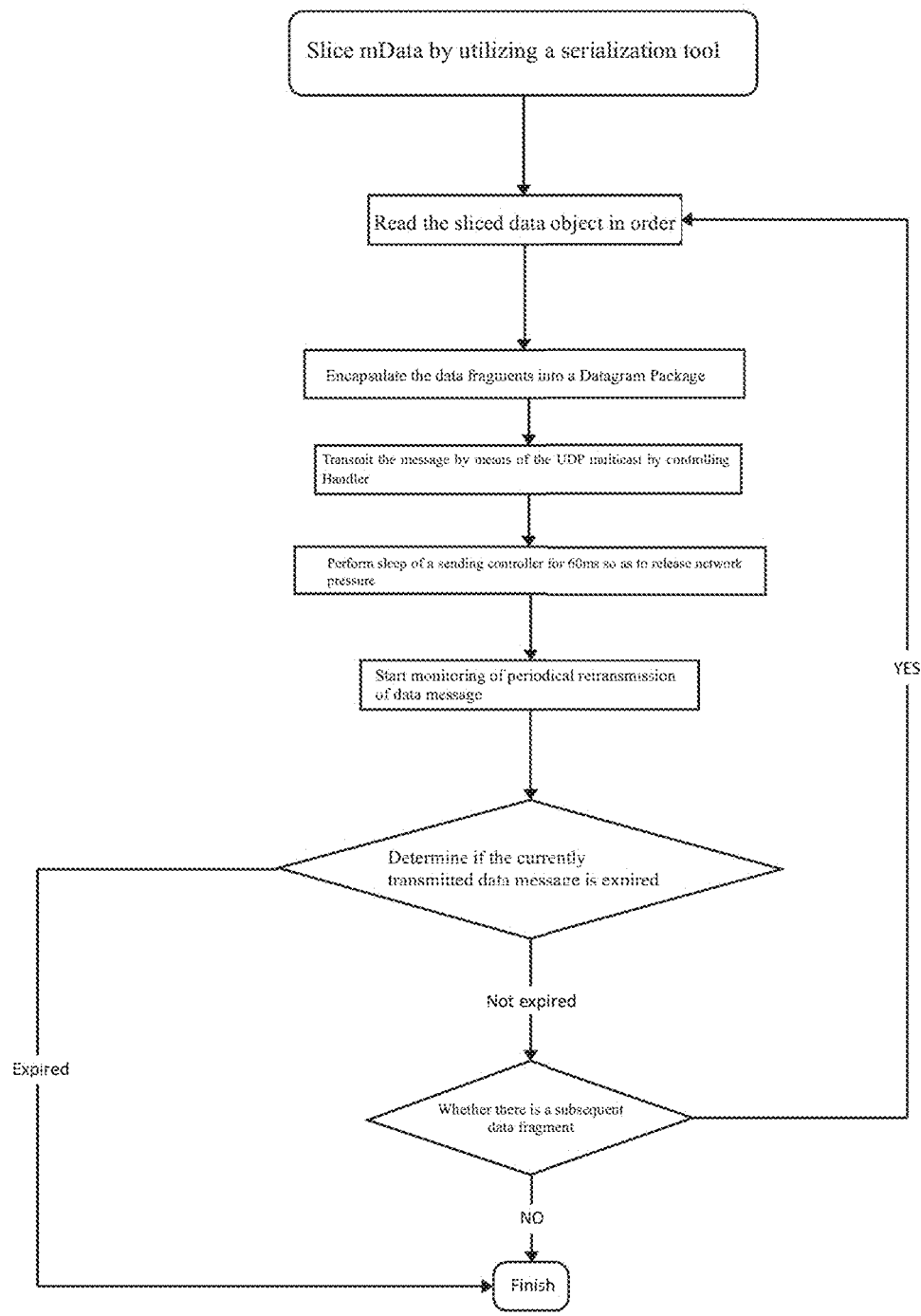
FIG. 11 is a schematic diagram of thread monitoring according to the present disclosure.

As shown in FIG. 11, the step of thread monitoring is configured to perform real-time monitoring on the thread when transmission is performed based on the UDP protocol, and perform a retransmission operation for lost packet data. Basic steps are as follows: slicing mData by utilizing a serialization tool; reading the sliced data object in order; encapsulating the data fragments into a Datagram Package; transmitting the message by means of the UDP multicast by controlling Handler; performing sleep of a sending controller for 60 ms so as to release network pressure; starting monitoring of periodical retransmission of data message; determining if the currently transmitted data message is expired; and if yes, determining that the current operation is finished, and otherwise, continuing determining whether there is a subsequent data fragment and continue acquiring the data.

The present disclosure uses the wireless AP to transmit the segmented data packet through the UDP protocol based on the SSM model. Advantages of the SSM model are that network traffic is reduced; load of a server and a CPU is reduced; redundant flow is reduced; and a multipoint application is made possible. However, the disadvantages are also obvious. Due to communication through the UDP protocol, a non-long connection and packet loss are caused.

In order to remove redundant same screen instruction information, ensure high-rate and stable execution of the same screen program, ensure reliability of uplink data transmission from the point view of network communication uplink (a device to an AP), and provide dual protections of transmitting data accurately and efficiently to student user terminals, the present disclosure uses the way of thread monitoring to solve the above problems.

The specific operational processes are as follows:

B1: a step of processing data message for transmission:

Signing and numbering, by the teacher user terminal, the data messages to be transmitted to ensure that IDs of message groups transmitted each time are unified and unique; sending the data messages to a multicast address of a wireless AP (access point), which is a fixed multicast address ranging in 234.5. *. * multicast network segment; and automatically calculating the multicast address when the teacher user terminal starts a program to ensure that each classroom independently occupies a multicast address in a network environment, especially in a local area network environment.

B2: a step of starting up a self-daemon thread:

Starting up, by the teacher user terminal, a self-daemon thread and a timer after transmitting the data message, and setting up a retransmission stack; storing the data and target transmitted this time in the retransmission stack; and starting up, by the self-daemon thread, data message retransmission processing when no data message feedback is received from the student user terminal after the time of starting up the self-daemon thread is reached; and sending the data packet to the student user terminal with no feedback;

B3: a step of starting up a feedback daemon thread:

Automatically starting, by the teacher user terminal, the feedback daemon thread after transmitting a multicast User Datagram Protocol (UDP) data packet and receiving a feedback message from the student user terminal for the first time, wherein the thread performs a guarantee retransmission processing on the feedback of the user terminal according to the segmented data packet and stops the self-daemon thread at the same time; and B4: a message feedback step:

First checking, by the client of the student user terminal, whether the received data has been received completely when receiving the multicast data packet from the teacher user terminal, and merging and restoring the data message if the received data has been received completely; and sending the feedback information to the teacher user terminal immediately while receiving each data message.

Figure 12:
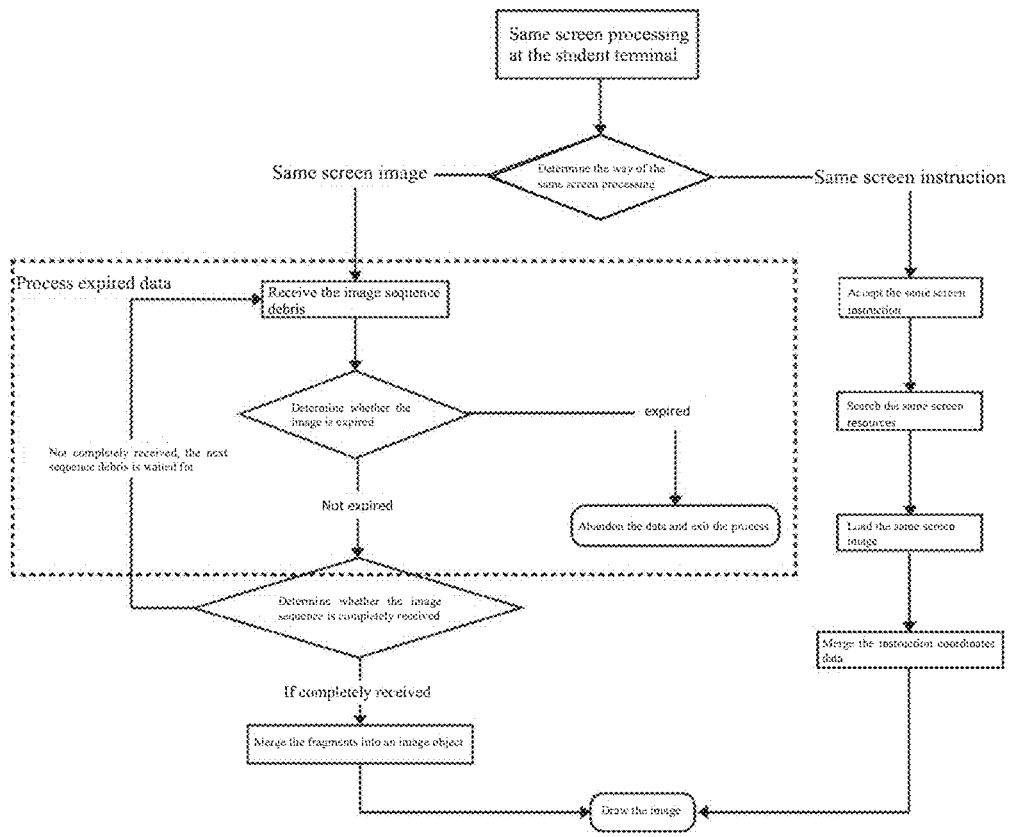
FIG. 12 is a diagram of same screen displaying of the student user terminal according to the present disclosure.

As shown in the dashed box section in FIG. 12, the expired data processing step is configured to discard expired data in the system to ensure smooth network transmission. As regards the same screen processing at the student terminal, the way of the same screen processing is first determined. If it is the same screen instruction, the same screen instruction is accepted, the same screen resources are searched; the same screen image is loaded; instruction coordinates data is merged; and then an image is drawn. If it is the same screen image, the image sequence debris is received; whether the image is expired is determined; if expired, it is abandoned, and otherwise, whether the image sequence is completely received is determined; and if the image sequence is not completely received, the next sequence debris is waited for, and when completely received, fragments are merged into an image object and the image is drawn locally.

The expired data refers to that when a data packet is being transmitted in a network during the real-time monitoring process of the data packet transmitted by the network, the teacher user terminal sends a new data packet and the teaching system detects the existence of a new data packet, and the detected old data is considered as the expired data.

The expired data is discarded by the teaching system. The expired data in the processing process is discarded by the teacher user terminal, the student user terminal, the wireless AP, and other device at the same time, so as to reduce pressure to the network brought by transmitting data in the network and ensure the student user terminal displays the latest data transmitted from the teacher user terminal in real time.

Figure 13:
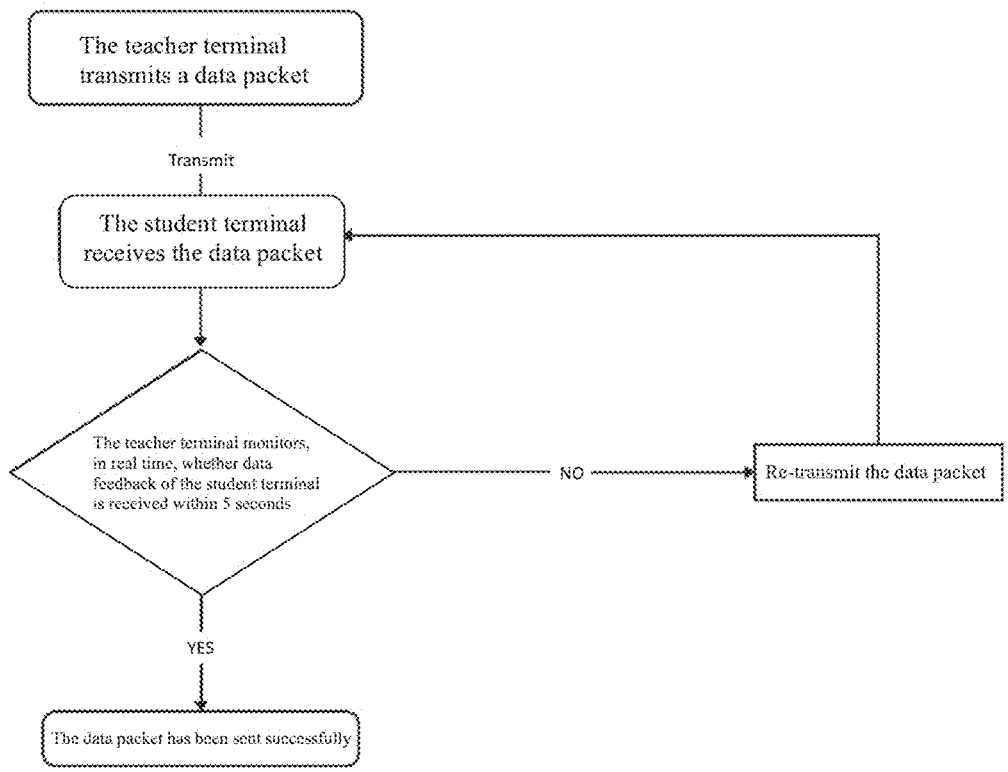
FIG. 13 is a schematic diagram of the student user terminal feedback mechanism according to the present disclosure.

As shown in FIG. 13, first checks, by the client of the student user terminal, whether the received data has been received completely when receiving the multicast data packet from the teacher user terminal, and merges and restores the data message if the received data has been received completely; and sends the feedback information to the teacher user terminal immediately while receiving each data message. Specifically, the teacher terminal sends a data packet and the student terminal receives the data packet. The teacher terminal monitors, in real time, whether data feedback of the student terminal is received within 5 seconds. If not, the teacher terminal retransmits the data packet, and if so, the teacher terminal confirms that the data packet has been sent successfully.

After the student user terminal receives the instruction information, feedback information is sent to the teacher user terminal. By the feedback information from the student terminal, the teacher terminal determines whether the student has received instruction completely. If the teacher terminal determines that the student terminal has received the instruction completely, the teacher terminal carries out the next step processing (for example, sending an instruction, a voice, and so on), if the teacher terminal determines that the student terminal has not received the instruction completely, then processes to re-transmit instructions until the student terminal receives it completely.

Based on this, the specific process of the step of processing expired data is as follows:

C1: uploading, by the teacher user terminal, the multicast message to the server; and transmitting, by the server, the multicast message to the student user terminal through the network transmission;

C2: pushing, by the student user terminal, the message information into the stack, if the message signature is the packet group currently being processed when receiving the multicast packet, and transmitting the feedback information to the teacher user terminal;

C3: emptying the data in the stack, pushing new data into the stack, and performing the follow-up processing after the message data has been received completely if the multicast packet signature received by the student user terminal is newer than data processed in the current stack, which indicates the data in the stack is expired;

C4: discarding, by the system, currently received data message if the multicast packet signature received by the student user terminal is older than data processed in the current stack, which indicates the received data message is expired; and C5: receiving, by the teacher user terminal, the data message feedback information from the student user terminal, discarding the data message and performing no other processing if the time stamp of the message is expired, which indicates that there is a delay for the student user terminal to receive the message and the data is expired; and receiving the feedback information if the time stamp of the received data message is the currently transmitted data packet.

As shown in FIG. 12, the synchronous displaying step is configured to realize synchronous display on the student user terminal for receiving data.

A client or an APP on student user terminal is built-in with an image sub data packet merging and displaying module configured to merge the received several sub data packets such as several temporary TMP files to form a complete JPEG image, and display the image on the student user terminal to achieve the purpose of the same screen display; and, is built-in with a file operation logic module that is the same as the one on the teacher user terminal; the student user terminal in advance loads the electronic file resources of this class during the same screen application process; and during live teachers' courses, the student user terminal acquires, by means of the server, teachers operation instruction data of an electronic document/file, such as an instruction or coordinate point data, and automatically simulates a teacher's operation by using the built-in logic module in combination with the downloaded class electronic document resources, so as to achieve the purpose of the same screen application display.

To build the studying ability of the system sever, a dictionary table (a database table) in the system records a variety of file operation instructions, and by means of database index matching, points the operation instruction at an actual execution language corresponding to the operation instruction. The terminal completes the simulation operation execution by reading the actual execution language.

By applying the method of the present disclosure, the same screen data information is not limited to images and the like, and the same screen information is pushed by transmitting instructions and coordinate point data, thus greatly reducing the amount of concurrent data of the network, increasing the same screen speed substantially, saving a lot of storage space and usage traffic, and replacing traditional ways of recording video streams.

The above description is based on a network teaching system, which is carried out on the same screen displaying of communication between a student user and a teacher user. It can be understood that the so-called student user and teacher user of the present disclosure in other similar communication system based on the network can be a participant, a conference host, a spokesman, etc. in a network conference. Relationships between them can be equal or can be a master-slave relationship, and the relationships can be switched or swapped. The so-called student user, the teacher user, and the network teaching system are not intended to limit the use of the present disclosure, which is only an exemplary description of a typical phenomenon. Any applications based on network requirements of sending display content and/or operation content on a terminal to at least one other terminal of the other end of the network can be applied to the present disclosure.

The foregoing description relates to the preferred embodiments of the present disclosure, it is intended to make the spirit of the present disclosure clearer and easier to understand, but not to limit the present disclosure. Any modifications, equivalent variations, and improvements within the spirit and principles of the present disclosure should fall into the scope of the appended claims.

What is claimed is:

1. A method implemented by a network teaching system comprising a teacher user terminal, a plurality of student user terminals, a server, and a network for performing synchronous display of images at the teacher user terminal and the plurality of student user terminals, the method comprising:
   starting up the teacher user terminal;
   acquiring a same screen displaying image from the teacher user terminal, wherein the same screen displaying image is content displayed on a screen of the teacher user terminal, wherein the same screen displaying image is collected by an electronic whiteboard, a projection input apparatus, a handwriting input apparatus, a blackboard or a whiteboard, and an image collecting apparatus comprising a video camera, and wherein the same screen displaying image is in a Bit Map Picture (BMP) format;
   acquiring same screen application data from the teacher user terminal by recording coordinate data of a user's blackboard-writing trajectory that results in the same screen displaying image when the user draws the same screen displaying image through the teacher user terminal;
   generating a compressed image by compressing the same screen displaying image using a Joint Photographic Experts Group (JPEG) format;
   determining whether to transmit the compressed image based on whether the same screen displaying image is different than an adjacent image to the same screen displaying image, wherein the same screen displaying image and the adjacent image are acquired at different times by the teacher user terminal;
   providing several sub data packets by segmenting a packet including the compressed image and the same screen application data when a total length of the packet exceeds a threshold and when it is determined to transmit the compressed image, wherein the several sub data packets are segmented temporary TMP files;
   transmitting the segmented temporary TMP files to the plurality of student user terminals in a multicast mode based on a User Datagram Protocol (UDP) protocol;
   performing real-time monitoring on the segmented temporary TMP files when transmitting the segmented temporary TMP files;
   discarding an expired data processed in a stack of one of the plurality of student user terminals in the network teaching system to ensure a smooth network transmission when the real-time monitoring determines that a new data received by the one of the plurality of student user terminals is newer than the expired data; and
   displaying, on each of the plurality of student user terminals, an JPEG image formed by merging the segmented temporary TMP files upon receipt of the segmented temporary TMP files by each of the plurality of student user terminals.

2. The method of claim 1, wherein the same screen application data is obtained by recording and transferring an instruction and coordinate point data comprising path coordinate data by using a client or an APP on the teacher user terminal.

3. The method of claim 2, wherein the recording the path coordinate data comprises:
   A1: generating parsed path coordinate data by parsing the path coordinates data, and storing the parsed path coordinate data to a temporary instruction coordinate stack, and then making an initial arrangement on the screen, and setting a background pattern on a canvas of the screen;
   A2: creating a new bitmap, and using the new bitmap to generate a temporary canvas;
   A3: setting a background of a temporary bitmap (temptBitmap) to transparent for the purpose of locating a target of the temporary canvas (temptCanvas) in the temporary bitmap;
   A4: extracting coordinate instructions from an instruction stack and restoring the coordinate instructions one by one, a corresponding image being drawn on the temptBitmap by all draw functions of the temporary canvas through rewriting performed by means of the temptCanvas, so that in an action backtracking process, draw points, draw lines call the temptCanvas instead of the canvas originally on the screen, comprising temptCanvas.drawPoint and temptCanvas.temptCanvasRect; and
   A5: after execution of all instruction stacks, executing Canvas.drawBitmap (tempBitmap,0,0,null), wherein the temptCanvas is responsible for drawing various brush marks on the tempBitmap, whereas the Canvas is responsible for drawing tempBitmap on the screen.

4. The method of claim 1, wherein before compressing the same screen displaying image, the same screen displaying image is backed up to generate original backup same screen displaying image in an original image backup database, and when a user receives the compressed image and needs to view a finer image, the same screen displaying image is downloaded from the original image backup database by a click operation.

5. The method of claim 4, wherein when it is determined not to transmit the compressed image, the original backup same screen displaying image compressed image is deleted from the original image backup database.

6. The method of claim 1, wherein the generating the compressed image further comprises an JPEG image primary compression process and an image secondary compression process.

7. The method of claim 6, wherein the image secondary compression process comprises setting a further compression ratio according to an image size and {minimum value, maximum value}: {minSize, maxSize} of a number of file bytes specified by the system based on a following code:
If (image.getBytes ( )>maxSize)
{compression ratio=image.getBytes ( )/maxSize*system-defined offset} Else, {compression ratio=1},
wherein the image compression ratio is obtained according to a size of the image composed of the compressed image and {minSize, maxSize} of a specified number of file bytes, wherein when the size of the image is greater than maxSize, a compression ratio is expressed by:

compression ratio=image size/maximum value*system-defined offset, wherein when the size of the image is not greater than maxsize, the compression ratio is set to be 1, and wherein the defined offset is between 0.4 and 0.6.

8. The method of claim 6, wherein the JPEG image primary compression process comprises:
copying and saving a DC eigenvalue and an AC eigenvalue of each image as an independent data file when the same screen displaying image is compressed;
according to the independent data file, calculating a difference value between the DC eigenvalue and the AC eigenvalue of two adjacent images in turn, wherein a greater difference value indicates a bigger difference between the two adjacent images, and a smaller difference value or no differences indicates a smaller difference or no differences between the two adjacent images; and
determining a latter image of the two adjacent images does not need to be transmitted to the plurality of student user terminals.

9. The method of claim 8, wherein the calculating the difference value between the DC eigenvalue and the AC eigenvalue comprises:
comparing the DC eigenvalue and the AC eigenvalue between the two adjacent images;
marking as 1 when signs of components of the DC eigenvalue are the same, and marking as 0 when the signs of the components of the DC eigenvalues are different;
marking as 0 when a difference between components of the AC eigenvalues exceeds a contrast threshold, and marking as 1 when the difference between components of the AC eigenvalues does not exceed the contrast threshold; and
calculating a number of 0s or 1s, and summing the number of 0s or 1s to obtain the difference value between the two adjacent images, wherein a greater number of 0s indicates a greater difference between eigenvectors and a greater difference between the two adjacent images.

10. The method of claim 9, wherein a plurality of storage files for storing a plurality of DC eigenvalues and AC eigenvalues are set, wherein another storage file is used when one folder is full, and wherein the full folder is cleared by the system for backup.

11. The method of claim 9, wherein a time of intercepting screen image content is gradually and automatically prolonged when no change is, in a long time, detected between screen contents intercepted consecutively.

12. The method of claim 9, wherein current screen content is marked as first edition blackboard-writing content when the difference value is detected to keep basically stable within a certain range, and wherein a starting of a new layout blackboard-writing or new displaying content is judged when a relatively large change in the difference value is detected.

13. The method of claim 1, wherein when the compressed JPEG image and the screen application data packet are larger than a limited length of the message, segmenting the JPEG image and the screen application data packet into several sub data packets according to an equal ratio of the message, wherein the segmenting the JPEG image and the screen application data packet comprises segmenting the JPEG image and the screen application data packet into several temporary TMP files, wherein the several temporary TMP files are transmitted through the network in a multicast mode, and wherein after the plurality of student user terminals obtain all the several temporary TMP files, the several temporary TMP files are merged to form a complete JPEG image, so as to be locally displayed on the plurality of student user terminals.

14. The method of claim 13, wherein the data is dynamically calculated and segmented according to a data length, and a maximum number of segments is no more than five of such two sets of conditions for comprehensive calculation to obtain a relatively better message array for transmission.

15. The method of claim 1, wherein a client of one of the plurality of student user terminals, when receiving a multicast data packet from the teacher user terminal, first checks whether the data has been received completely, and merges and restores the data message if the data has been received completely, wherein feedback information is sent to the teacher user terminal immediately when each data message is received, and
wherein the one of the plurality of student user terminals sends feedback information to the teacher user terminal after receiving instruction information.

16. The method of claim 15, wherein the performing the real-time monitoring on the two or more transmission data packets when transmitting the two or more transmission data packets comprises:
B1: a step of processing data message for transmission, comprising:
signing and numbering, by the teacher user terminal, the data messages to be transmitted to ensure that IDs of message groups transmitted each time are unified and unique;
sending the data messages to a multicast address of a wireless access point (AP), wherein the multicast address is a fixed multicast address ranging in 234.5. *. * multicast network segment; and
automatically calculating the multicast address when the teacher user terminal starts a program to ensure that each classroom independently occupies a multicast address in a network environment, especially in a local area network environment;
B2: a step of starting up a self-daemon thread, comprising:
starting up, by the teacher user terminal, a self-daemon thread and a timer after transmitting the data message;
setting up a retransmission stack;
storing the data and target transmitted in the retransmission stack;
starting up, by the self-daemon thread, data message retransmission processing when no data message feedback is received from the plurality of student user terminals after the time of starting up the self-daemon thread is reached; and sending the data packet to the plurality of student user terminals with no feedback;

B3: a step of starting up a feedback daemon thread, comprising:
automatically starting, by the teacher user terminal, a feedback daemon thread after transmitting a multicast User Datagram Protocol (UDP) data packet; and
receiving a feedback message from the plurality of student user terminals for a first time, wherein the thread performs a guarantee retransmission processing on a feedback of the user terminal according to the segmented data packet and stops the self-daemon thread at the same time; and B4: a message feedback step, comprising:
first checking, by clients of the plurality of student user terminals, whether the received data has been received completely when receiving the multicast data packet from the teacher user terminal;
merging and restoring the data message if the received data has been received completely; and
sending the feedback information to the teacher user terminal immediately while receiving each data message.

17. The method of claim 1, wherein the discarding the expired data in the network teaching system comprises:
C1: uploading, by the teacher user terminal, the multicast message to the server; and transmitting, by the server, the multicast message to the plurality of student user terminals through network transmission;
C2: pushing, by the plurality of student user terminals, the message information into a stack, if a message signature is the packet group currently being processed when receiving the multicast packet, and transmitting the feedback information to the teacher user terminal;
C3: emptying the data in the stack, pushing new data into the stack, and performing a follow-up processing after the message data has been received completely if the multicast packet signature received by the plurality of student user terminals is newer than data processed in a current stack, indicating the data in the stack is expired;
C4: discarding, by the system, currently received data message if the multicast packet signature received by the plurality of student user terminals is older than data processed in the current stack, indicating the received data message is expired; and
C5: receiving, by the teacher user terminal, the data message feedback information from the plurality of student user terminals, discarding the data message and performing no other processing if the time stamp of the message is expired, indicating that there is a delay for the plurality of student user terminals to receive the message and the data is expired; and receiving the feedback information if the time stamp of the received data message is the currently transmitted data packet.

18. The method of claim 1, wherein when displaying the same screen displaying image simultaneously on the plurality of student user terminals upon receipt of the two or more transmission data packets, a client or an APP on one of the plurality of student user terminals is built-in with an image sub data packet merging and displaying module, wherein the image sub data packet merging and displaying module is configured to merge the received several sub data packets such as several temporary TMP files to form a complete JPEG image, and wherein the image sub dat packet merging and displaying module is configured to display the image on the plurality of student user terminals to achieve simultaneous screen display, wherein the client or the APP on the one of the plurality of student user terminals is built-in with a file operation logic module that is the same as the one on the teacher user terminal, wherein the one of the plurality of student user terminals in advance loads the electronic file resources of this class during a same screen application process, wherein during live teachers' courses, the one of the plurality of student user terminals acquires, by means of the server, teachers operation instruction data of an electronic document/file, such as an instruction or coordinate point data, and automatically simulates a teacher's operation by using the built-in logic module in combination with the downloaded class electronic document resources, so as to achieve a purpose of a same screen application display.

19. The method of claim 1, wherein the same screen displaying image is locally displayed by the plurality of student user terminal and saved as a portion of a reproducible video stream, and wherein playback of the reproducible video stream is matched with the relative audio recording of the teacher according to time characteristics to form a video stream with a voice.

20. A network teaching system for performing synchronous display of images at a teacher user terminal and a plurality of student user terminals of the network teaching system, the network teaching system comprising:
the teacher user terminal;
the plurality of student user terminals;
a server;
a network;
a processor; and
a non-transitory computer readable storage medium having computer readable code, wherein the computer readable code, when executed by the processor, causes the processor to:
start up the teacher user terminal;
acquire a same screen displaying image from the teacher user terminal, wherein the same screen displaying image is content displayed on a screen of the teacher user terminal, wherein the same screen displaying image is collected by an electronic whiteboard, a projection input apparatus, a handwriting input apparatus, a blackboard or a whiteboard, and an image collecting apparatus comprising a video camera, and wherein the same screen displaying image is in a Bit Map Picture (BMP) format;
acquire same screen application data from the teacher user terminal by recording coordinate data of a user's blackboard-writing trajectory that results in the same screen displaying image when the user draws the same screen displaying image through the teacher user terminal;
generate a compressed image by compressing the same screen displaying image using a Joint Photographic Experts Group (JPEG) format;
determine whether to transmit the compressed image based on whether the same screen displaying image is different than an adjacent image to the same screen displaying image, wherein the same screen displaying image and the adjacent image are acquired at different times by the teacher user terminal;
provide several sub data packets by segmenting a packet including the compressed image and the same screen application data when a total length of the packet exceeds a threshold and when it is determined to transmit the compressed image, wherein the several sub data packets are segmented temporary TMP files;

transmit the segmented temporary TMP files to the plurality of student user terminals in a multicast mode based on a User Datagram Protocol (UDP) protocol;

perform real-time monitoring on the segmented temporary TMP files when transmitting the segmented temporary TMP files;

discard an expired data processed in a stack of one of the plurality of student user terminals in the network teaching system to ensure a smooth network transmission when the real-time monitoring determines that a new data received by the one of the plurality of student user terminals is newer than the expired data; and display, on each of the plurality of student user terminals, an JPEG image formed by merging the segmented temporary TMP files upon receipt of the segmented temporary TMP files by each of the plurality of student user terminals.

21. The network teaching system of claim 20, wherein the same screen application data is obtained by recording and transferring an instruction and coordinate point data comprising path coordinate data by using a client or an APP on the teacher user terminal.

22. The network teaching system of claim 21, wherein the recording the path coordinate data comprises:

A1: generating parsed path coordinate data by parsing the path coordinates data, and storing the parsed path coordinate data to a temporary instruction coordinate stack, and then making an initial arrangement on the screen, and setting a background pattern on a canvas of the screen;

A2: creating a new bitmap, and using the new bitmap to generate a temporary canvas;

A3: setting a background of a temporary bitmap (temptBitmap) to transparent for the purpose of locating a target of the temporary canvas (temptCanvas) in the temporary bitmap;

A4: extracting coordinate instructions from an instruction stack and restoring the coordinate instructions one by one, a corresponding image being drawn on the temptBitmap by all draw functions of the temporary canvas through rewriting performed by means of the temptCanvas, so that in an action backtracking process, draw points, draw lines call the temptCanvas instead of the canvas originally on the screen, comprising temptCanvas.drawPoint and temptCanvas.temptCanvasRect; and A5: after execution of all instruction stacks, executing Canvas.drawBitmap (tempBitmap,0,0,null), wherein the temptCanvas is responsible for drawing various brush marks on the tempBitmap, whereas the Canvas is responsible for drawing tempBitmap on the screen.

23. The network teaching system of claim 22, wherein the data is dynamically calculated and segmented according to a data length, and a maximum number of segments is no more than five of such two sets of conditions for comprehensive calculation to obtain a relatively better message array for transmission.

24. The network teaching system of claim 20, wherein before compressing the same screen displaying image, the same screen displaying image is backed up to generate original backup same screen displaying image in an original image backup database, and when a user receives the compressed image and needs to view a finer image, the same screen displaying image is downloaded from the original image backup database by a click operation.

25. The network teaching system of claim 24, wherein when it is determined not to transmit the compressed image, the original backup first screen displaying image compressed image is deleted from the original image backup database.

26. The network teaching system of claim 20, wherein the generating the compressed image further comprises an JPEG image primary compression process and an image secondary compression process.

27. The network teaching system of claim 26, wherein the image secondary compression process comprises setting a further compression ratio according to an image size and {minimum value, maximum value}: {minSize, maxSize} of a number of file bytes specified by the system based on a following code:

If (image.getBytes ( )>maxSize)
{compression ratio=image.getBytes ( )/maxSize*system-defined offset}
Else,
{compression ratio=1}, wherein the image compression ratio is obtained according to a size of the image composed of the compressed image and {minSize, maxSize} of a specified number of file bytes, wherein when the size of the image is greater than maxSize, a compression ratio is expressed by:

compression ratio=image size/maximum value*system-defined offset, wherein when the size of the image is not greater than maxsize, the compression ratio is set to be 1, and wherein the defined offset is between 0.4 and 0.6.

28. The network teaching system of claim 26, wherein the JPEG image primary compression process comprises:

copying and saving a DC eigenvalue and an AC eigenvalue of each image as an independent data file when the same screen displaying image is compressed;

according to the independent data file, calculating a difference value between the DC eigenvalue and the AC eigenvalue of two adjacent images in turn, wherein a greater difference value indicates a bigger difference between the two adjacent images, and a smaller difference value or no differences indicates a smaller difference or no differences between the two adjacent images; and determining a latter image of the two adjacent images does not need to be transmitted to the plurality of student user terminals.

29. The network teaching system of claim 28, wherein the calculating the difference value between the DC eigenvalue and the AC eigenvalue comprises:

comparing the DC eigenvalue and the AC eigenvalue between the two adjacent images;

marking as 1 when signs of components of the DC eigenvalue are the same, and marking as 0 when the signs of the components of the DC eigenvalues are different;

marking as 0 when a difference between components of the AC eigenvalues exceeds a contrast threshold, and marking as 1 when the difference between components of the AC eigenvalues does not exceed the contrast threshold; and calculating a number of 0s or 1s, and summing the number of 0s or 1s to obtain the difference value between the two adjacent images, wherein a greater number of 0s indicates a greater difference between eigenvectors and a greater difference between the two adjacent images.

30. The network teaching system of claim 29, wherein a plurality of storage files for storing a plurality of DC eigenvalues and AC eigenvalues are set, wherein another storage file is used when one folder is full, and wherein the full folder is cleared by the system for backup.

31. The network teaching system of claim 29, wherein a time of intercepting screen image content is gradually and automatically prolonged when no change is, in a long time, detected between screen contents intercepted consecutively.

32. The network teaching system of claim 29, wherein current screen content is marked as first edition blackboard-writing content when the difference value is detected to keep basically stable within a certain range, and wherein a starting of a new layout blackboard-writing or new displaying content is judged when a relatively large change in the difference value is detected.

33. The network teaching system of claim 20, wherein when the compressed JPEG image and the screen application data packet are larger than a limited length of the message, segmenting the JPEG image and the screen application data packet into several sub data packets according to an equal ratio of the message, wherein the segmenting the JPEG image and the screen application data packet comprises segmenting the JPEG image and the screen application data packet into several temporary TMP files, wherein the several temporary TMP files are transmitted through the network in a multicast mode, and wherein after the plurality of student user terminals obtain all the several temporary TMP files, the several temporary TMP files are merged to form a complete JPEG image, so as to be locally displayed on the plurality of student user terminals.

34. The network teaching system of claim 20, wherein a client of one of the plurality of student user terminals, when receiving a multicast data packet from the teacher user terminal, first checks whether the data has been received completely, and merges and restores the data message if the data has been received completely, wherein feedback information is sent to the teacher user terminal immediately when each data message is received, and wherein the one of the plurality of student user terminals sends feedback information to the teacher user terminal after receiving instruction information.

35. The network teaching system of claim 25, wherein the performing the real-time monitoring on the two or more transmission data packets when transmitting the two or more transmission data packets comprises:
    B1: a step of processing data message for transmission, comprising:
    signing and numbering, by the teacher user terminal, the data messages to be transmitted to ensure that IDs of message groups transmitted each time are unified and unique;
    sending the data messages to a multicast address of a wireless access point (AP), wherein the multicast address is a fixed multicast address ranging in 234.5.*.* multicast network segment; and
    automatically calculating the multicast address when the teacher user terminal starts a program to ensure that each classroom independently occupies a multicast address in a network environment, especially in a local area network environment;
    B2: a step of starting up a self-daemon thread, comprising:
    starting up, by the teacher user terminal, a self-daemon thread and a timer after transmitting the data message;
    setting up a retransmission stack;
    storing the data and target transmitted in the retransmission stack;
    starting up, by the self-daemon thread, data message retransmission processing when no data message feedback is received from the plurality of student user terminals after the time of starting up the self-daemon thread is reached; and
    sending the data packet to the plurality of student user terminals with no feedback;
    B3: a step of starting up a feedback daemon thread, comprising:
    automatically starting, by the teacher user terminal, a feedback daemon thread after transmitting a multicast User Datagram Protocol (UDP) data packet; and
    receiving a feedback message from the plurality of student user terminals for a first time, wherein the thread performs a guarantee retransmission processing on a feedback of the user terminal according to the segmented data packet and stops the self-daemon thread at the same time; and
    B4: a message feedback step, comprising:
    first checking, by the client of the plurality of student user terminals, whether the received data has been received completely when receiving the multicast data packet from the teacher user terminal;
    merging and restoring the data message if the received data has been received completely; and
    sending the feedback information to the teacher user terminal immediately while receiving each data message.

36. The network teaching system of claim 20, wherein the discarding the expired data in the network teaching system comprises:
    C1: uploading, by the teacher user terminal, the multicast message to the server; and transmitting, by the server, the multicast message to the plurality of student user terminals through network transmission;
    C2: pushing, by the plurality of student user terminals, the message information into a stack, if a message signature is the packet group currently being processed when receiving the multicast packet, and transmitting the feedback information to the teacher user terminal;
    C3: emptying the data in the stack, pushing new data into the stack, and performing a follow-up processing after the message data has been received completely if the multicast packet signature received by the plurality of student user terminals is newer than data processed in a current stack, indicating the data in the stack is expired;
    C4: discarding, by the system, currently received data message if the multicast packet signature received by the plurality of student user terminals is older than data processed in the current stack, indicating the received data message is expired; and
    C5: receiving, by the teacher user terminal, the data message feedback information from the plurality of student user terminals, discarding the data message and performing no other processing if the time stamp of the message is expired, indicating that there is a delay for the plurality of student user terminals to receive the message and the data is expired; and receiving the feedback information if the time stamp of the received data message is the currently transmitted data packet.

37. The network teaching system of claim 20, wherein when displaying the same screen displaying image simultaneously on the plurality of student user terminals upon receipt of the two or more transmission data packets, a client or an APP on one of the plurality of student user terminals is built-in with an image sub data packet merging and displaying module, wherein the image sub data packet merging and displaying module is configured to merge the received several sub data packets such as several temporary TMP files to form a complete JPEG image, and wherein the image sub data packet merging and displaying module is configured to display the image on the plurality of student user terminals to achieve simultaneous screen display, wherein the client or the APP on the one of the plurality of student user terminals is built-in with a file operation logic module that is the same as the one on the teacher user terminal, wherein the one of the plurality of student user terminals in advance loads the electronic file resources of this class during a same screen application process, wherein during live teachers' courses, the one of the plurality of student user terminals acquires, by means of the server, teachers operation instruction data of an electronic document/file, such as an instruction or coordinate point data, and automatically simulates a teacher's operation by using the built-in logic module in combination with the downloaded class electronic document resources, so as to achieve a purpose of a same screen application display.

38. The network teaching system of claim 20, wherein the same screen displaying image is locally displayed by the plurality of student user terminals and saved as a portion of a reproducible video stream, and wherein playback of the reproducible video stream is matched with the relative audio recording of the teacher according to time characteristics to form a video stream with a voice.

39. A non-transitory computer readable storage medium in a network teaching system for performing synchronous display of images at a teacher user terminal and a plurality of student user terminals in the network teaching system, wherein the network teaching system comprises a server, the teacher user terminal, the plurality of student user terminals, a processor, and the non-transitory computer readable storage medium having computer readable code, and wherein the computer readable code, when executed by the processor, causes the processor to perform following:

starting up the teacher user terminal;
acquiring a same screen displaying image from the teacher user terminal, wherein the same screen displaying image is content displayed on a screen of the teacher user terminal, wherein the same screen displaying image is collected by an electronic whiteboard, a projection input apparatus, a handwriting input apparatus, a blackboard or a whiteboard, and an image collecting apparatus comprising a video camera, and wherein the same screen displaying image is in a Bit Map Picture (BMP) format;

acquiring same screen application data from the teacher user terminal by recording coordinate data of a user's blackboard-writing trajectory that results in the same screen displaying image when the user draws the same screen displaying image through the teacher user terminal;

generating a compressed image by compressing the same screen displaying image using a Joint Photographic Experts Group (JPEG) format;

determining whether to transmit the compressed image based on whether the same screen displaying image is different than an adjacent image to the same screen displaying image, wherein the same screen displaying image and the adjacent image are acquired at different times by the teacher user terminal;

providing several sub data packets by segmenting a packet including the compressed image and the same screen application data when a total length of the packet exceeds a threshold and when it is determined to transmit the compressed image, wherein the several sub data packets are segmented temporary TMP files;

transmitting the segmented temporary TMP files to the plurality of student user terminals in a multicast mode based on a User Datagram Protocol (UDP) protocol;

performing real-time monitoring on the segmented temporary TMP files when transmitting the segmented temporary TMP files;

discarding an expired data processed in a stack of one of the plurality of student user terminals in the network teaching system to ensure a smooth network transmission when the real-time monitoring determines that a new data received by the one of the plurality of student user terminals is newer than the expired data; and displaying, on each of the plurality of student user terminals, an JPEG image formed by merging the segmented temporary TMP files upon receipt of the segmented temporary TMP files by each of the plurality of student user terminals.

* * * * *